United States Patent Office 3,384,586
Patented May 21, 1968

3,384,586
RESINOUS COMPOSITIONS
Richard L. McMillen, Painesville, Ohio, assignor to The Lubrizol Corporation, Wickliffe, Ohio, a corporation of Ohio
No Drawing. Continuation-in-part of application Ser. No. 535,742, Mar. 21, 1966, which is a continuation-in-part of application Ser. No. 185,521, Apr. 6, 1962. This application Jan. 30, 1967, Ser. No. 612,332
25 Claims. (Cl. 252—33)

ABSTRACT OF THE DISCLOSURE

A polymeric composition possessing improved rheological properties comprising a mixture of a polymeric resin and a non-Newtonian colloidal disperse system which system is characterized as being a colloidal dispersion of solid, metal-containing colloidal particles predispersed in an inert organic liquid and, as an essential third component of the system, an organic compound with molecules which contain a hydrophobic portion and at least one polar substituent. An exemplary composition would contain polyvinyl chloride polymer, a plasticizer for the polymer, and a disperse system comprising calcium carbonate particles, a liquid hydrocarbon disperse medium, and a calcium petrosulfonate. A method for imparting improved rheological properties to polymeric resinous compositions by incorporating such a disperse system into the compositions is described.

The invention

This application is a continuation-in-part of earlier filed applications Ser. No. 185,521, filed Apr. 6, 1962, now Patent No. 3,242,079; Ser. No. 309,293, filed Sept. 16, 1963, now abandoned; Ser. No. 323,135, filed Nov. 12, 1963, now abandoned; Ser. No. 369,271, filed May 21, 1964; Ser. No. 535,048, filed Mar. 17, 1966; Ser. No. 535,742, filed Mar. 21, 1966; and Ser. No. 580,575, filed Sept. 20, 1966.

This invention relates to resinous compositions characterized by non-Newtonian rheological properties. In particular, the invention concerns resinous compositions comprising as an essential constituent a non-Newtonian colloidal disperse system in intimate admixture with the remaining ingredients of the composition and to methods for making such compositions.

It is well known in the art that many applications of resinous compositions require that the compositions possess certain rheological characteristics. Specifically, it is desirable that the rate of flow of the compositions be dependent upon the rate of shear, i.e., strain. Thus, the "apparent" viscosity of such compositions depends upon the rate of shear. At low rates of shear, the viscosity of the composition appears high but as the rate of shear applied to the compositions increases, the "apparent" viscosity decreases.

The particular type of non-Newtonian flow characteristics possessed by the resinous compositions of the present invention are characterized as thixotropic and pseudoplastic. The apparent viscosity of the thixotropic composition depends on both the rate of shear and the length of time in which a shearing action is applied. A pseudoplastic composition has an apparent viscosity which is low at high rates of shear but which appears higher as the rate of shear decreases. Its viscosity is, however, independent of the duration of the shearing action. The rheological characteristics of materials are discussed further in many standard texts such as: B. Jirgensons and M. E. Straumanis, A Short Textbook on Colloidal Chemistry (2nd ed.), The Macmillan Co., N.Y., 1962, particularly pages 178 through 183.

Thixotropic and pseudoplastic properties are obviously important in many compositions containing polymeric resins such as paints, greases, caulks, coatings, molding compositions, extruding compositions, and the like. For example, paints should flow sufficiently under the pressure of a brush in order to cover the surface involved. Yet, the paint must remain sufficiently "thick" or viscous to prevent precipitation of the pigment during storage and prior to drying and to stop the paint from flowing after the pressure of the brush is removed. Similarly, when articles are coated by dipping them into resinous compositions, it is important that the apparent viscosity of the compositions decrease as the result of the mechanical action associated with lowering the article into the composition. However, upon removal, the material coated on the article is no longer subject to any mechanical action and should become more viscous to avoid sagging or further flowing of the coating over the surface. When extruding various plastic compositions, it is desirable that the flow rate for the plastic increase under the force of the extruder screw but the flow rate should decrease rapidly after exiting the extruder so that the article retains its shape. Moreover, the difference in apparent viscosity of materials during extrusion and after exiting the extruder is a factor in determining the maximum satisfactory extrusion speeds, an important economic consideration in the plastics industry.

These are but a few of the many applications of resinous compositions characterized by pseudoplastic or thixotropic flow characteristics. Many other uses are known to those skilled in the art and need no additional elaboration herein.

In accordance with the foregoing, it is a principal object of the invention to provide novel resinous compositions.

Another object is to provide resinous compositions having pseudoplastic or thixotropic flow properties.

A further object is to provide resinous compositions comprising as an essential constituent a non-Newtonian colloidal disperse system in intimate admixture with other constituents in the composition.

Another object is to provide resinous compositions containing as an essential ingredient a colloidal disperse system capable of imparting pseudoplastic, thixotropic, and lubricating properties to the composition.

A still further object is to provide a method for imparting pseudoplastic or thixotropic properties to resinous compositions by intimately admixing therewith an effective amount of a non-Newtonian colloidal disperse system.

An additional object of the invention is to provide a process for preparing the novel resinous compositions of this invention.

These and other objects of the invention are achieved by providing a resinous composition comprising an intimate mixture of (A) a polymeric resin and (B) a non-Newtonian colloidal disperse system comprising (1) solid metal-containing colloidal particles predispersed in (2) a disperse medium of at least one inert, organic liquid, and (3) as an essential third component at least one member selected from the class consisting of organic compounds which are substantially soluble in said disperse medium, the molecules of said organic compound being characterized by polar substituents and hydrophobic portions. The polymeric resins and the colloidal disperse system which comprise the essential ingredients of the resinous composition of the invention are discussed more fully hereinafter.

The polymeric resin

Representative classes of suitable polymeric resins useful in the compositions of the invention include polyolefins, polyamides, acrylics, polystyrenes, polysulfides, polyethers, polyfluorocarbons, polymercaptans, polyesters, polyurethanes, acetal resins, polyterpenes, phenolics, cellulosics, melamine resins, furane resins, alkyd resins, silicone resins, natural resins, mixtures of natural resins, mixtures of synthetic resins, mixtures of natural and synthetic resins, and the like. These classes of resins are well known as evidenced by such prior-art as "Modern Plastics" (Encyclopedia Issue), Vol. 38, No. 1A, September 1960, published by Breskins Publications, Inc., Bristol, Connecticut. This publication sets forth many illustrative examples falling within the above classes of resins as well as other suitable polymeric materials.

More specifically, representative examples of the many suitable polymeric resin compositions include the following: polyacrylic acids, polymethacrylic acids, poly-2-halo-acrylic acids, poly-2-cyanoacrylic acids, and the corresponding polyesters of these acids wherein the alcoholic moiety is derived from (1) alkanols of one to about twenty carbon atoms, e.g., methanol, ethanol, butanol, octanol, lauryl alcohol, stearyl alcohol, ethylene glycol, polyethylene glycol; (2) haloalkanols such as 2-chloroethanol; (3) aminoalkanols, e.g., 2-(tert-butylamino)-ethanol and 2-diethlaminoethanol; (4) alkoxy alkanols exemplified by 2-methoxy-ethanol, 2-ethoxy-ethanol, and 3-ethoxy-propanol; and (5) cycloalkanols such as cyclohexanol and cyclopropanol; the corresponding polyamides of these acids including alkylene bis-amides and other N-substituted amides such as N-tert-butylacrylamide; polyacrylonitrile, and acrylic resins derived from the copolymerization of two or more of these acrylic monomers, i.e., acrylic acid, acrylonitrile, methacrylic acid, 2-chloroacrylic acid, 2-cyanoacrylic acid, and the corresponding amides and esters of these acids. Polymers and copolymers of the N-3-oxohydrocarbon substituted acrylamides of the type disclosed in U.S. Patent 3,277,056 are also contemplated.

Other suitable polymeric resins include celluloses such as cellulose nitrates, cellulose acetates, cellulose propionates, cellulose butyrates, ethylcellulose; and combinations of these such as cellulose acetate butyrate; polyolefins exemplified by polyethylene, polypropylene, polybutenes, polyisobutylenes, ethylene-propylene copolymers, ethylene-propylene copolymers including up to about 3% of a diolefin; polyhalo olefins, e.g., polytetrafluoroethylenes, polychlorotrifluoroethylenes; polyamides including polycaprolactams, polyamides derived from sebacic and/or adipic acid and alkylene polyamines such as hexamethylene diamine, the polyamide derived from the polymerization of 11-amino undecanoic acid; polystyrene and styrene containing copolymers and terpolymers such as copolymers of styrene and acrylonitrile or terpolymers of styrene, 1,3-butadiene, and acrylonitrile; the chlorinated polyether derived from opening a chlorinated oxetane ring prepared from pentaerythritol, e.g., the polyether sold under the name Penton by Hercules Powder Co.

Still other suitable resins, include the polymers and copolymers of vinyl chloride, vinylidine chloride, and vinyl esters such as vinyl acetate; polyvinyl acetals such as polyvinyl acetal per se and polyvinyl butyral; urea-formaldehyde resins; melamine-formaldehyde resins; coumarone-indene resins; phenol-formaldehyde resins; phenol-furfural resins; and the like. Various mixtures of these resins can also be utilized in the compositions of the invention.

The resinous compositions contemplated by the present invention include dispersion resins, i.e.: (1) plastisols, (2) organosols, and (3) modified plastisols such as plasticized resins exemplified by plasticized polyvinyl chloride, polyvinyl acetate, cellulose acetates, cellulose nitrates, and the like. The colloidal disperse systems are readily incorporated into these liquid compositions simply by mixing. The terms "plastisol," "organosol," and "modified plastisol" are terms of art used to describe various liquid resinous materials in the form of suspensions or solutions of powdered or pelletized resins in various plasticizers, diluents, dispersants, solvents, etc. (See "Modern Plastics," supra, pages 130–131, 413–415.) In fact, these dispersion resin compositions are a preferred class of polymeric resins in which to employ the colloidal disperse systems.

Plasticizers which can be utilized in the resinous compositions of this invention include phthalates, phosphates, adipates, azelates, sebacates, and the like. Specific examples are the dialkyl phthalates such as di-(2-ethylhexyl)-phthalates, dibutyl phthalate, diethyl phthalate, dioctyl phthalate, butyl octyl phthalate; dicyclohexyl phthalate, butyl benzyl phthalate; triaryl phosphates such as tricresyl phosphate, triphenyl phosphate, cresyl diphenyl phosphates; trialkyl phosphates such as trioctyl phosphate and tributyl phosphate; alkoxyalkyl phosphates such as tributoxyethyl phosphate; alkylaryl phosphates such as octyl diphenyl phosphate; alkyl adipates such as di-(2-ethylhexyl)adipate, diisooctyl adipate, octyl decyl adipate; dialkyl sebacates such as dibutyl secabate, dioctyl sebacate, diisooctyl sebacate; alkyl azelates such as di(2-ethylhexyl)azelate and di-(2-ethylbutyl)azelate; and the like. Other plasticizers include citrates such as acetyl tri-n-butyl citrate, acetyl triethyl citrate, monoisopropyl citrate, triethyl citrate, mono-, di-, and tri-stearyl citrate; triacetin, p-tert-butyl phenyl salicylate, butyl stearate; benzoic acid esters derived from diethylene glycol, dipropylene glycol, triethylene glycol, and polyethylene glycols; sulfonamides such as toluenesulfonamide, etc. A listing of illustrative suitable plasticizers is found on pages 413 through 416 and 648 to 664 of the above-cited volume of "Modern Plastics."

The amount of plasticizer employed, if one is employed, will depend on the nature of the polymeric resin and the plasticizer. However, as readily shown by reference to the cited portions of "Modern Plastics," the use of plasticized resins is conventional and the selection of an appropriate type and amount of plasticizer or mixture of plasticizers for a particular polymeric resin or mixture of resins is well within the skill of the art.

The coloidal disperse systems

The terminology "disperse system" as used in the specification and claims is a term of art generic to colloids or colloidal solutions, e.g., "any homogeneous medium containing dispersed entities of any size and state," Jirgensons and Straumanis, page 1, supra. However, the particular disperse ssytems of the present invention form a subgenus within this broad class of disperse systems, this subgenus being characterized by several important features.

This subgenus comprises those disperse systems wherein at least a portion of the particles dispersed therein are solid, metal-containing particles formed in situ. At least about 10% to about 50% are particles of this type and preferably, substantially all of said solid particles are formed in situ.

So long as the solid particles remain dispersed in the dispersing medium as colloidal particles the particle size is not critical. Ordinarily, the particles will not exceed 5000 A. However, it is preferred that the maximum unit particle size be less than about 1000 A. In a particularly preferred aspect of the invention, the unit particle size is less than about 400 A. Systems having a unit particle size in the range of 30 A. to 200 A. give excellent results. The minimum unit particle size is at least 20 A. and preferably at least about 30 A.

The language "unit particle size" is intended to designate the average particle size of the solid, metal-containing particles assuming maximum dispersion of the individual particles throughout the disperse medium. That is, the unit particle is that particle which corresponds in size to the average size of the metal-containing particles and is capable of independent existence within the disperse system as a discrete colloidal particle. These metal-containing particles are found in two forms in the disperse systems. Individual unit particles can be dispersed as such throughout the medium or unit particles can form an agglomerate, in combination with other materials (e.g., another metal-containing particle, the disperse medium, etc.) which are present in the disperse systems. These agglomerates are dispersed through the system as "metal-containing particles." Obviously, the "particle size" of the agglomerate is substantially greater than the unit particle size. Furthermore, it is equally apparent that this agglomerate size is subject to wide variations, even within the same disperse system. The agglomerate size varies, for example, with the degree of shearing action employed in dispersing the unit particles. That is, mechanical agitation of the disperse system tends to break down the agglomerates into the individual components thereof and disperse these individual components throughout the disperse medium. The ultimate in dispersion is achieved when each solid, metal-containing particle is individually dispersed in the medium. Accordingly, the disperse systems are characterized with reference to the unit particle size, it being apparent to those skilled in the art that the unit particle size represents the average size of solid, metal-containing particles present in the system which can exist independently. The average particle size of the metal-containing solid particles in the system can be made to approach the unit particle size value by the application of a shearing action to the existent system or during the formation of the disperse system as the particles are being formed in situ. It is not necessary that maximum particle dispersion exist to have useful disperse systems. The agitation associated with homogenization of the overbased material and conversion agent produces sufficient particle dispersion.

Basically, the solid metal-containing particles are in the form of metal salts of inorganic acids and low molecular weight organic acids, hydrates thereof, or mixtures of these. These salts are usually the alkali and alkaline earth metal formates, acetates, carbonates, hydrogen carbonates, hydrogen sulfides, sulfites, hydrogen sulfites, and halides, particularly chlorides. In other words, the metal-containing particles are ordinarily particles of metal salts, the unit particle is the individual salt particle and the unit particle size is the average particle size of the salt particles which is readily ascertained, as for example, by conventional X-ray diffraction techniques. Colloidal disperse systems possessing particles of this type are sometimes referred to as macromolecular colloidal systems.

Because of the composition of the colloidal disperse systems of this invention, the metal-containing particles also exist as components in micellar colloidal particles. In addition to the solid metal-containing particles and the disperse medium, the colloidal disperse systems of the invention are characterized by a third essential component, one which is soluble in the medium and contains in the molecules thereof a hydrophobic portion and at least one polar substituent. This third component can orient itself along the external surfaces of the above metal salts, the polar groups lying along the surface of these salts with the hydrophobic portions extending from the salts into the disperse medium forming micellar colloidal particles. These micellar colloids are formed through weak intermolecular forces, e.g., Van der Waals forces, etc. Micellar colloids represent a type of agglomerate particle as discussed thereinabove. Because of the molecular orientation in these micellar colloidal particles, such particles are characterized by a metal containing layer (i.e., the solid metal-containing particles and any metal present in the polar substituent of the third component, such as the metal in a sulfonic or carboxylic acid salt group), a hydrophobic layer formed by the hydrophobic portions of the molecules of the third component and a polar layer bridging said metal-containing layer and said hydrophobic layer, said polar bridging layer comprising the polar substituents of the third component of the system, e.g., the

group if the third component is an alkaline earth metal petrosulfonate.

The second essential component of the colloidal disperse system is the dispersing medium. The identity of the medium is not a particularly critical aspect of the invention as the medium primarily serves as the liquid vehicle in which solid particles are dispersed. The disperse medium will normally consist of inert organic liquids, that is, liquids which are chemically substantially inactive in the particular environment in question (the resinous composition). While many of these inert organic liquids are nonpolar, this is not essential. For example, many of the plasticizers for the resinous components of the composition are esters, etc. These polar materials can also be used as the dispersing medium or components thereof. The medium can have components characterized by relatively low boiling points, e.g., in the range of 25° to 120° C. to facilitate subsequent removal of a portion or substantially all of the medium from the polymeric resin composition or the components can have a higher boiling point to protect against removal from the resinous composition upon standing or heating. Obviously, there is no criticality in an upper boiling point limitation on these liquids.

Representative liquids include the alkanes and haloalkanes of five to eighteen carbons, polyhalo- and perhalo-alkanes of up to about six carbons, the cycloalkanes of five or more carbons, the corresponding alkyl- and/or halo-substituted cycloalkanes, the aryl hydrocarbons, the alkylaryl hydrocarbons, the haloaryl hydrocarbons, ethers such as dialkyl ethers, alky aryl ethers, cycloalkyl ethers, cycloalkylalkyl ethers alkanols, alkylene glycols, polyalkylene glycols, alkyl ethers of alkylene gycols and polyalkylene glycols, dibasic alkanoic acid diesters, silicate esters, and mixtures of these. Specific examples include petroleum ether, Stoddard Solvent, pentane, hexane, octane, isoctane, undecane, tetradecane, cyclopentane, cyclohexane, isopropylcyclohexane, 1,4 - dimethylcyclohexane, cyclooctane, benzene, toluene, xylene, ethyl benzene, tert-butyl-benzene, halobenzenes especially mono- and polychlorobenzenes such as chlorobenzene per se and 3,4-dichlorotoluene, mineral oils, n-propylether, isopropylether, isobutylether, n-amylether, methyl-n-butylether, methyl-n-amyl-ether, cyclohexylether, ethoxycyclohexane, methoxybenzene, isopropoxybenzene, p-methoxytoluene, methanol, ethanol, propanol, isopropanol, hexanol, n-octyl alcohol, n-decyl alcohol, alkylene glycols such as ethylene glycol and propylene glycol, diethyl ketone, dipropyl ketone, methylbutyl ketone, acetophenone, 1,2-fluoro-tetrachloroethane, dichlorofluoromethane, 1,2-dibromo - tetrafluoroethane, trichlorofluoromethane, 1-chloropentane, 1,3 - dichlorohexane, formamide, dimethylformamide, acetamide, dimethylacetamide, diethylacetamide, propionamide, di-isooctyl azelate, ethylene glycol, polypropylene glycols, hexa-2-ethylbutoxy disiloxane, etc.

Also useful as dispersing mediums are the low molecular weight, liquid polymers, generally classified as oligomers, which include the dimers, tetramers, pentamers, etc. Illustrative of this large class of materials are such liquids as the propylene tetramers, isobutylene dimers, and the like.

From the standpoint of availability, cost, and performance, the alkyl, cycloalkyl, and aryl hydrocarbons represent a preferred class of disperse mediums. Liquid petroleum fractions represent another preferred class of disperse mediums. Included within these preferred classes are benzenes and alkylated benzenes, cycloalkanes and alkylated cycloalkanes, cycloalkenes and alkylated cycloalkenes such as found in naphthene-based petroleum fractions, and the alkanes such as found in the paraffin-based petroleum fractions. Petroleum ether, naphthas, mineral oils, Stoddard Solvent, toluene, xylene, etc., and mixtures thereof are examples of economical sources of suitable inert organic liquids which can function as the disperse medium in the colloidal disperse systems of the present invention.

The most preferred disperse systems are those containing at least some mineral oil as a component of the disperse medium. These systems are particularly effective as lubricants for the polymeric composition, an important feature in extrusion processes. Any amount of mineral oil is beneficial in this respect. However, in this preferred class of systems, it is desirable that mineral oil comprise at least about 1% by weight of the total medium, and preferably at least about 5% by weight. Those mediums comprising at least 10% by weight mineral oil are especially useful. As will be seen hereinafter, mineral oil can serve as the exclusive disperse medium.

In addition to the solid, metal-containing particles in the disperse medium, the two essential elements of any disperse system, the disperse systems employed in the polymeric compositions of the invention require a third essential component. This third component is an organic compound which is soluble in the disperse medium, and the molecules of which are characterized by a hydrophobic portion and at least one polar substituent. As explained, infra, the organic compounds suitable as a third component are extremely diverse. These compounds are inherent constituents of the disperse systems as a result of the methods used in preparing the systems. Further characteristics of the components are apparent from the following discussion of methods for preparing the colloidal disperse systems.

Preparation of the disperse systems

Broadly speaking, the colloidal disperse systems of the invention are prepared by treating a single phase homogeneous, Newtonian system of an "overbased," "superbased," or "hyperbased," organic compound with a conversion agent, usually an active hydrogen containing compound, the treating operation being simply a thorough mixing together of the two components, i.e., homogenization. This treatment converts these single phase systems into the non-Newtonian colloidal disperse systems utilized in conjunction with the polymeric resins of the present invention.

The terms "overbased," "superbased," and "hyperbased," are terms of art which are generic to well known classes of metal-containing materials which have generally been employed as detergents and/or dispersants in lubricating oil compositions. These overbased materials have also been referred to as "complexes," "metal complexes," "high-metal containing salts," and the like. Overbased materials are characterized by a metal content in excess of that which would be present according to the stoichiometry of the metal and the particular organic compound reacted with the metal, e.g., a carboxylic or sulfonic acid. Thus, if a monosulfonic acid,

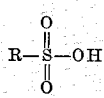

is neutralized with a basic metal compound, e.g., calcium hydroxide, the "normal" metal salt produced will contain one equivalent of calcium for each equivalent of acid, i.e.,

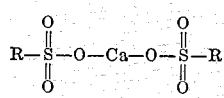

However, as is well known in the art, various processes are available which result in an inert organic liquid solution of a product containing more than the stoichiometric amount of metal. The solutions of these products are referred to herein as overbased materials. Following these procedures, the sulfonic acid or an alkali or alkaline earth metal salt thereof can be reacted with a metal base and the product will contain an amount of metal in excess of that necessary to neutralize the acid, for example, 4.5 times as much metal as present in the normal salt of a metal excess of 3.5 equivalents. The actual stoichiometric excess of metal can vary considerably, for example, from about 0.1 equivalent to about 30 or more equivalents depending on the reactions, the process conditions, and the like. These overbased materials useful in preparing the disperse systems will contain from about 3.5 to about 30 or more equivalents of metal for each equivalent of material which is overbased.

In the present specification and claims the term "overbased" is used to designate materials containing a stoichiometric excess of metal and is, therefore, inclusive of those materials which have been referred to in the art as overbased, superbased, hyperbased, etc., as discussed supra.

The terminology "metal ratio" is used in the prior art and herein to designate the ratio of the total chemical equivalents of the metal in the overbased material (e.g., a metal sulfonate or carboxylate) to the chemical equivalents of the metal in the product which would be expected to result in the reaction between the organic material to be overbased (e.g., sulfonic or carboxylic acid) and the metal-containing reactant (e.g., calcium hydroxide, barium oxide, etc.) according to the known chemical reactivity and stoichiometry of the two reactants. Thus, the normal calcium sulfonate discussed above, the metal ratio is one and in the overbased sulfonate, the metal ratio is 4.5. Obviously, if there is present in the material to be overbased more than one compound capable of reacting with the metal, the "metal ratio" of the product will depend upon whether the number of equivalents of metal in the overbased product is compared to the number of equivalents expected to be present for a given single component or a combination of all such components.

Generally, these overbased materials are prepared by treating a reaction mixture comprising the organic material to be overbased, a reaction medium consisting essentially of at least one, inert, organic solvent for said organic material, a stoichiometric excess of a metal base, and a promoter with an acidic material. The methods for preparing the overbased materials as well as an extremely diverse group of overbased materials are well known in the prior art and are disclosed, for example in the following U.S. Patents: 2,616,904, 2,616,905, 2,616,906, 2,616,911, 2,616,924, 2,616,925, 2,617,049, 2,695,910, 2,723,234, 2,723,235, 2,723,236, 2,760,970, 2,767,164, 2,767,209, 2,777,874, 2,798,852, 2,839,470, 2,856,359, 2,859,360, 2,856,361, 2,861,951, 2,883,340, 2,915,517, 2,959,551, 2,968,642, 2,971,014, 2,989,463, 3,001,981, 3,027,325, 3,070,581, 3,108,960, 3,147,232, 3,133,019, 3,146,201, 3,152,991, 3,155,616, 3,170,880, 3,170,881, 3,172,855, 3,194,823, 3,223,630, 3,232,883, 3,242,079, 3,242,080, 3,250,710, 3,256,186, 3,274,135. These patents disclosed exemplary processes for synthesizing the overbased materials used in producing the disperse systems of the invention and are, accordingly, incorporated herein by reference for their discussion of these processes, materials which can be overbased, suitable metal bases, promoters, and acidic materials, as well as a variety of specific overbased products.

An important characteristic of the organic materials which are overbased in their solubility in the particular reaction medium utilized in the overbasing process. As the reaction medium used previously has normally comprised petroleum fractions, particularly mineral oils, these organic materials have generally been oil-soluble.

However, if another reaction medium is employed (e.g. aromatic hydrocarbons, aliphatic hydrocarbons, kerosene, etc.) it is not essential that the organic material be soluble in mineral oil as long as it is soluble in the given reaction medium. Obviously, many organic materials which are soluble in mineral oils will be soluble in many of the other indicated suitable reaction mediums. It should be apparent that the reaction medium usually becomes the disperse medium of the colloidal disperse system or at least a component thereof depending on whether or not additional inert organic liquid is added as part of the reaction medium or the disperse medium.

Materials which can be overbased are generally oil-soluble organic acids including phosphorus acids, thiophosphorus acids, sulfur acids, carboxylic acids, thiocarboxylic acids, and the like, as well as the corresponding alkali and alkaline earth metal salts thereof. Representative examples of each of these classes of organic acids as well as other organic acids, e.g., nitrogen acids, arsenic acids, etc. are disclosed along with methods of preparing overbased products therefrom in the above cited patents and are, accordingly, incorporated herein by reference. Patent 2,777,874 identifies organic acids suitable for preparing overbased materals which can be converted to disperse systems for use in the resinous compositions of the invention. Similarly, 2,616,904, 2,695,910, 2,767,164, 2,767,209, 3,147,232, 3,274,135, etc. disclose a variety of organic acids suitable for preparing overbased materials as well as representative examples of overbased products prepared from such acids. Overbased acids wherein the acid is a phosphorus acid, a thiophosphorus acid, phosphorus acid-sulfur acid combination, and sulfur acid prepared from polyolefins are disclosed in 2,883,340, 2,915,517, 3,001,981, 3,108,960, and 3,232,883. Overbased phenates are disclosed in 2,959,551 while overbased ketones are found in 2,798,852. A variety of overbased materials derived from oil-soluble metal-free, non-tautomeric neutral and basic organic polar compounds such as esters, amines, amides, alcohols, ethers, sulfides, sulfoxides, and the like are disclosed in 2,968,642, 2,971,014, and 2,989,463. Another class of materials which can be overbased are the oil-soluble, nitro-substituted aliphatic hydrocarbons, particularly nitro-substituted polyolefins such as polyethylene, polypropylene, polyisobutylene, etc. Materials of this type are illustrated in 2,959,551. Likewise, the oil-soluble reaction product of alkylene polyamines such as propylene diamine or N-alkylated propylene diamine with formaldehyde or formaldehyde producing compound (e.g., paraformaldehyde) can be overbased. Other compounds suitable for overbasing are disclosed in the above-cited patents or are otherwise well-known in the art.

The organic liquids used as the disperse medium in the colloidal disperse system can be used as solvents for the overbasing process.

The metal compounds used in preparing the overbased materials are normally the basic salts of metals in Group I-A and Group II-A of the Periodic Table although other metals such as lead, zinc, manganese, etc. can be used in the preparation of overbased materials. The anionic portion of the salt can be hydroxyl, oxide, carbonate, hydrogen carbonate, nitrate, sulfite, hydrogen sulfite, halide, amide, sulfate etc. as disclosed in the above-cited patents. For purposes of this invention the preferred overbased materials are prepared from the alkaline earth metal oxides, hydroxides, and alcoholates such as the alkaline earth metal lower alkoxides. The most preferred disperse systems of the invention are made from overbased materials containing calcium and/or barium as the metal.

The promoters, that is, the materials which permit the incorporation of the excess metal into the overbased material, are also quite diverse and well known in the art as evidenced by the cited patents. A particularly comprehensive discussion of suitable promoters is found in 2,777,874; 2,695,910; and 2,616,904. These include the alcoholic and phenolic promoters which are preferred. The alcoholic promoters include the alkanols of one to about twelve carbon atoms such as methanol, ethanol, amyl alcohol, octano, isopropanol, and mixtures of these and the like. Phenolic promoters include a variety of hydroxy-substituted benzenes and naphthalenes. A particularly useful class of phenols are the alkylated phenols of the type listed in 2,777, 874, e.g., heptylphenols, octylphenols, and nonylphenols. Mixtures of various promoters are sometimes used.

Suitable acidic materials are also disclosed in the above cited patents, for example 2,616,904. Included within the known group of useful acidic materials are liquid acids such as formic acid, acetic acid, nitric acid, sulfuric acid, hydrochlorc acid, hypdrobromic acid, carbamic acid, substituted carbamic acids, etc. Acetic acid is a very useful acidic material although inorganic acidic materials such as HCl, $SO_2$, $SO_3$, $CO_2$, $H_2S$, $N_2O_3$, etc., are ordinarily employed as the acidic materials. The most preferred acidic materials are carbon dioxide and acetic acid.

In preparing overbased materials, the material to be overbased, an inert, non-polar, organic solvent therefor, the metal base, the promoter, and the acidic material are brought together and a chemical reaction ensues. The exct nature of the resulting overbased product is not known. However, it can be adequately described for purposes of the present specification as a single phase homogeneous mixture of the solvent and (1) either a metal complex formed from the metal base, the acidic material, and the material being overbased and/or (2) an amorphous metal salt formed from the reaction of the acidic material with the metal base and the material which is said to be overbased. Thus, if mineral oil is used as the reaction medium, petrosulfonic acid as the material which is overbased, $Ca(OH)_2$ as the metal base, and carbon dioxide as the acidic material, the resulting overbased material can be described for purposes of this invention as an oil solution of either a metal containing complex of the acidic material, the metal base, and the petrosulfonic acid or as an oil solution of amorphous calcium carbonate and calcium petrosulfonate. Since the overbased materials are well-known and as they are used merely as intermediates in the preparation of the disperse systems employed herein, the exact nature of the materials is not critical to the present invention.

The temperature at which the acidic material is contacted with the remainder of the reaction mass depends to a large measure upon the promoting agent used. With a phenolic promoter, the temperature usually ranges from about 80° C. to 300° C., and preferably from about 100° C. to about 200° C. When an alcohol or mercaptan is used as the promoting agent, the temperature usually will not exceed the reflux temperature of the reaction mixture and preferably will not exceed about 100° C.

In view of the foregoing, it should be apparent that the overbased materials may retain all or a portion of the promoter. That is, if the promoter is not volatile (e.g., an alkyl phenol) or otherwise readily removable from the overbased material, at least some promoter remains in the overbased product. Accordingly, the disperse systems made from such products may also contain the promoter. The presence or absence of the promoter in the overbased material used to prepare the disperse system and likewise, the presence or absence of the promoter in the colloidal disperse systems themselves does not represent a critical aspect of the invention. Obviously, it is within the skill of the art to select a volatile promoter such as a lower alkanol, e.g., methanol, ethanol, etc., so that the promoter can be readily removed prior to forming the disperse system or thereafter.

A preferred class of overbased materials used as starting materials in the preparation of the disperse systems of the present invention are the alkaline earth metal-overbased oil-soluble organic acids, preferably those containing at least twelve aliphatic carbons although the acids may contain as few as eight aliphatic carbon atoms if the acid molecule includes an aromatic ring such as phenyl, naphthyl, etc. Representative organic acids suitable for preparing these overbased materials are discussed and identified in detail in the above-cited patents. Particularly 2,616,904 and 2,777,874 disclose a variety of very suitable organic acids. For reasons of economy and performance, overbased oil-soluble carboxylic and sulfonic acids are particularly suitable. Illustrative of the carboxylic acids are palmitic acid, stearic acid, myristic acid, oleic acid, linoleic acid, behenic acid, hexatriacontanoic acid, tetropropylene-substituted glutaric acid, polyisobutene (M.W.—5000)-substituted succinic acid, polypropylene (M.W.—10,000)-substituted succinic acid, octadecyl-substituted adipic acid, chlorostearic acid, 9-methyl-stearic acid, dichlorostearic acid, stearylbenzoic acid, eicosane-substituted naphthoic acid, dilauryl-decahydronaphthalene carboxylic acid, didodecyl-tetralin carboxylic acid, dioctylcyclohexane carboxylic acid, mixtures of these acids, their alkali and alkaline earth metal salts, and/or their anhydrides. Of the oil-soluble sulfonic acids, the mono-, di-, and tri-alphatic hydrocarbon substituted aryl sulfonic acids and the petroleum sulfonic acids (petrosulfonic acids) are particularly preferred. Illustrative examples of suitable sulfonic acids include mahogany sufonic acids, petroleum sulfonic acids, monoeicosane-substituted naphthalene sulfonic acids, dodecylbenzene sulfonic acids, petrolatum sulfonic acids, monoeicosane-subbenzene sulfonic acids, cetyl-chlorobenzene sulfonic acids, dilauryl beta-naphthalene sulfonic acids, the sulfonic acid derived by the treatment of polyisobutene having a molecular weight of 1500 with chlorosulfonic acid, nitronaphthalenesulfonic acid, paraffin wax sulfonic acid, cetylcyclopentane sulfonic acid, lauryl-cyclo-hexanesulfonic acids, polyethylene (M.W.—750) sulfonic acids, etc. Obviously, it is necessary that the size and number of aliphatic groups on the aryl sulfonic acids be sufficient to render the acids soluble. Normally the aliphatic groups will be alky and/or akenyl groups such that the total number of aliphatic carbons is at least twelve.

Within this preferred group of overbased carboxylic and sulfonic acids, the barium and calcium overbased mono-, di-, and tri-alkylated benzene and naphthalene (including hydrogenated forms thereof), petrosulfonic acids, and higher fatty acids are especially preferred. Illustrative of the synthetically produced alkylated benzene and naphthalene sulfonic acids are those containing alkyl substituents having from 8 to about 30 carbon atoms therein. Such acids include di-isododecyl-benzene sulfonic acid, wax-substituted phenol sulfonic acid, wax-substituted benzene sulfonic acids, polybutene-substituted sulfonic acid, cetyl-chlorobenzene sulfonic acid, di-cetylnaphthalene sulfonic acid, di-lauryldiphenylether sulfonic acid, di-isononylbenzene sulfonic acid, di-isoocetadecylbenzenesulfonic acid, stearylnaphthalene sulfonic acid, and the like. The petroleum sulfonic acids are a well known art recognized class of materials which have been used as starting materials in preparing overbased products since the inception of overbasing techniques as illustrated by the above patents. Petroleum sulfonic acids are obtained by treating refined or semi-refined petroleum oils with concentrated or fuming sulfuric acid. These acids remain in the oil after the settling out of sludges. These petroleum sulfonic acids, depending on the nature of the petroleum oils from which they are prepared, are oil-soluble alkane sulfonic acids, alkyl-substituted cycloaliphatic sulfonic acids including cycloalkyl sulfonic acids and cycloalkene sulfonic acids, and alkyl, alkaryl, or aralkyl substituted hydrocarbon aromatic sulfonic acids including single and condensed aromatic nuclei as well as partially hydrogenated forms thereof. Examples of such petrosulfonic acids include mahogany sulfonic acid, white oil sulfonic acid, petrolatum sulfonic acid, petroleum naphthene sulfonic acid, etc. This especially preferred group of aliphatic fatty acids includes the saturated and unsaturated higher fatty acids containing from 12 to about 30 carbon atoms. Illustrative of these acids are lauric acid, palmitic acid, oleic acid, linoleic acid, linolenic acid, oleo-stearic acid, stearic acid, myristic acid, and undecalinic acid, alpha-chlorostearic acid, and alpha-nitrolauric acid.

As shown by the representative examples of the preferred classes of sulfonic and carboxylic acids, the acids may contain non-hydrocarbon substituents such as halo, nitro, alkoxy, hydroxyl, and the like.

It is desirable that the overbased materials used to prepare the disperse system have a metal ratio of at least about 3.5 and preferably about 4.5. An especially suitable group of the preferred sulfonic acid overbased materials has a metal ratio of at least about 7.0. While overbased materials having a metal ratio of 75 have been prepared, normally the maximum metal ratio will not exceed about 30 and, in most cases, not more than about 20.

The overbased materials used in preparing the colloidal disperse systems utilized in the polymeric compositions of the invention contain from about 10% to about 70% by weight of metal-containing components. As explained hereafter, the exact nature of these metal containing components is not known. It is theorized that the metal base, the acidic material, and the organic material being overbased form a metal complex, this complex being the metal-containing component of the overbased material. On the other hand, it has also been postulated that the metal base and the acidic material form amorphous metal compounds which are dissolved in the inert organic reaction medium and the material which is said to be overbased. The material which is overbased may itself be a metal-containing compound, e.g., a carboxylic or sulfonic acid metal salt. In such a case, the metal-containing components of the overbased material would be both the amorphous compounds and the acid salt. The exact nature of these overbased materials is obviously not critical in the present invention since these materials are used only as intermediates. The remainder of the overbased materials consist essentially of the inert organic reaction medium and any promoter which is not removed from the overbased product. For purposes of this application, the organic material which is subjected to overbasing is considered a part of the metal containing components. Normally, the liquid reaction medium constitutes at least about 30% by weight of the reaction mixture utilized to prepare the overbased materials.

As mentioned above, the colloidal disperse systems used in the composition of the present invention are prepared by homogenizing a "conversion agent" and the overbased starting material. Homogenization is achieved by vigorous agitation of the two components, preferably at the reflux temperature or a temperature slightly below the reflux temperature. The reflux temperature normally will depend upon the boiling point of the conversion agent. However, homogenization may be achieved within the range of about 25° C. to about 200° C. or slightly higher. Usually, there is no real advantage in exceeding 150° C.

The concentration of the conversion agent necessary to achieve conversion of the overbased material is usually within the range of from about 1% to about 80% based upon the weight of the overbased material excluding the weight of the inert, organic solvent and any promoter present therein. Preferably at least about 10% and usually less than about 60% by weight of the conversion agent is employed. Concentrations beyond 60% appear to afford no additional advantages.

The terminology "conversion agent" as used in the specification and claims is intended to describe a class of very diverse materials which possess the property of being able to convert the Newtonian homogeneous, single-phase, overbased materials into non-Newtonian colloidal disperse systems. The mechanism by which conversion is accomplished is not completely understood. However, with the exception of oxygen, carbon dioxide, air and mixtures of two or more of these, these conversion agents all possess active hydrogens. The conversion agents include lower aliphatic carboxylic acids, water, aliphatic alcohols, cycloaliphatic alcohols, arylaliphatic alcohols, phenols, ketones, aldehydes, amines, boron acids, phosphorus acids, oxygen, air, and carbon dioxide. Mixtures of two or more of these conversion agents are also useful. Particularly useful conversion agents are discussed below.

The lower aliphatic carboxylic acids are those containing less than about eight carbon atoms in the molecule. Examples of this class of acids are formic acid, acetic acid, propionic acid, butyric acid, valeric acid, isovaleric acid, isobutyric acid, caprylic acid, heptanoic acid, chloroacetic acid, dichloroacetic acid, trichloroacetic acid, etc. Formic acid, acetic acid, and propionic acid, are preferred with acetic acid being especially suitable. It is to be understood that the anhydrides of these acids are also useful and, for the purposes of the specification and claims of this invention, the term acid is intended to include both the acid per se and the anhydride of the acid.

Useful alcohols include aliphatic, cycloaliphatic, and arylaliphatic mono- and polyhydroxy alcohols. Alcohols having less than about twelve carbons are especially useful while the lower alkanols, i.e., alkanols having less than about eight carbon atoms are preferred for reasons of economy and effectiveness in the process. Illustrative are the alkanols such as methanol, ethanol, isopropanol, n-propanol, isobutanol, tertiary butanol, isooctanol, dodecanol, n-pentanol, etc.; cycloalkyl alcohols exemplified by cyclopentanol, cyclohexanol, 4-methylcyclohexanol, 2-cyclohexylethanol, cyclopentylmethanol, etc.; phenyl aliphatic alkanols such as benzyl alcohol, 2-phenylethanol, and cinnamyl alcohol; alkylene glycols of up to about six carbon atoms and mono-lower alkyl ethers thereof such as monomethylether of ethylene glycol, diethylene glycol, ethylene glycol, trimethylene glycol, hexamethylene glycol, triethylene glycol, 1,4-butanediol, 1,4-cyclohexanediol, glycerol, and pentaerythritol.

The use of a mixture of water and one or more of the alcohols is especially effective for converting the overbased materials to colloidal disperse systems. Such combinations often reduce the length of time required for the process. Any water-alcohol combination is effective but a very effective combination is a mixture of one or more alcohols and water in a weight ratio of alcohol to water of from about 0.05:1 to about 24:1. Preferably, at least one lower alkanol is present in the alcohol component of these water-alkanol mixtures. Water-alkanol mixtures wherein the alcoholic portion is one or more lower alkanols are especially suitable. Alcohol:water conversions are illustrated in co-pending application Ser. No. 535,693, filed Mar. 21, 1966.

Phenols suitable for use as conversion agents include phenol, naphthol, ortho-cresol, para-cresol, catechol, mixtures of cresol, para-tert-butylphenol, and other lower alkyl substituted phenols, meta-polyisobutene (M.W.—350)-substituted phenol, and the like.

Other useful conversion agents include lower aliphatic aldehydes and ketones, particularly lower alkyl aldehydes and lower alkyl ketones such as acetaldehydes, propionaldehydes, butyraldehydes, acetone, methylethyl ketone, diethyl ketone. Various aliphatic, cycloaliphatic, aromatic, and heterocyclic amines are also useful providing they contain at least one amino group having at least one active hydrogen attached thereto. Illustrative of these amines are the mono- and di-alkylamines, particularly mono- and di-lower alkylamines, such as methylamine, ethylamine, propylamine, dodecylamine, methyl ethylamine, diethylamine; the cycloalkylamines such as cyclohexylamine, cyclopentylamine, and the lower alkyl substituted cycloalkylamines such as 3-methylcyclohexylamine; 1,4-cyclohexylenediamine; arylamines such as aniline, mono-, di-, and tri-, lower alkyl-substituted phenyl amines, naphthylamines, 1,4-phenylene diamines; lower alkanol amines such as ethanolamine and diethanolamine; alkylenediamines such as ethylene diamine, triethylene tetramine, propylene diamines, octamethylene diamines; and heterocyclic amines such as piperazine, 4-aminoethylpiperazine, 2 - octadecyl - imidazoline, and oxazolidine. Boron acids are also useful conversion agents and include boronic acids (e.g., alkyl-B(OH)$_2$ or aryl-B(OH$_2$), boric acid (i.e., H$_3$BO$_3$), tetraboric acid, metaboric acid, and esters of such boron acids.

The phosphorus acids are useful conversion agents and include the various alkyl and aryl phosphinic acids, phosphinus acids, phosphonic acids, and phosphonous acids. Phosphorus acids obtained by the reaction of lower alkanols or unsaturated hydrocarbons such as polyisobutenes with phosphorus oxides and phosphorus sulfides are particularly useful, e.g., P$_2$O$_5$ and P$_2$S$_5$.

Oxygen, carbon dioxide, air, and various mixtures of oxygen and carbon dioxide can be used as conversion agents. However, it is preferable to use these conversion agents in combination with one or more of the foregoing conversion agents. For example, the combination of water and carbon dioxide is particularly effective as a conversion agent for transforming the overbased materials into a colloidal disperse system.

As previously mentioned, the overbased materials are single phase homogeneous systems. However, depending on the reaction conditions and the choice of reactants in preparing the overbased materials, there sometimes is present in the product insoluble contaminants. These contaminants are normally unreacted basic materials such as calcium oxide, barium oxide, calcium hydroxide, barium hydroxide, or other metal base materials used as a reactant in preparing the overbased material. It has been found that a more uniform colloidal disperse system results if such contaminants are removed prior to homogenizing the overbased material with the conversion agents. Obviously a more uniform disperse system makes it possible to achieve reproducability of properties in resinous compositions containing such systems. Accordingly, it is preferred that any insoluble contaminants in the overbased materials be removed prior to converting the material in the colloidal disperse system. The removal of such contaminants is easily accomplished by conventional techniques such as filtration or centrifugation. It should be understood however, that the removal of these contaminants, while desirable for reasons just mentioned, it is not an absolute essential aspect of the invention and useful products can be obtained when overbased materials containing insoluble contaminants are converted to the colloidal disperse systems.

The conversion agents or a proportion thereof may be retained in the colloidal disperse system. The conversion agents are however, not essential components of these disperse systems and it is usually desirable that as little of the conversion agents as possible be retained in the disperse system. Since these conversion agents do not react with the overbased material in such a manner as to be permanently bound thereto through some type of chemical bonding, it is normally a simple matter to remove a major proportion of the conversion agents and, generally, substantially all of the conversion agents. Some of the conversion agents have physical properties which make them readily removable from the disperse systems. Thus, most of the free carbon dioxide and/or oxygen gradually escape from the disperse system during the homogenization process or upon standing thereafter. Since the liquid conversion agents are generally more volatile than the remaining components of the disperse system, they are readily removable by conventional devolatilization techniques, e.g., heating, heating at reduced pressures, and the like. For this reason, it may be desirable to select conversion agents which will have boiling points which are lower than the remaining components of the disperse system. This is another reason why the lower alkanols, mixtures thereof, and lower alkanol-water mixtures are preferred conversion agents.

Again, it is not essential that all of the conversion agent be removed from the disperse systems. In fact, useful disperse systems for employment in the resinous compositions of the invention result without removal of the conversion agents. However, from the standpoint of achieving uniform results, it is generally desirable to remove the conversion agents, particularly where they are volatile. In some cases, the liquid conversion agents may facilitate the mixing of the colloidal disperse system with the polymeric resin material. In such cases, it is advantageous to permit the conversion agents to remain in the disperse system until it is mixed with the polymeric resin. Thereafter, the conversion agents can be removed from the mixture of the disperse system and polymeric resins by conventional devolatilization techniques if desired.

To better illustrate the colloidal disperse systems utilized in the invention, the procedure for preparing a preferred system is described below:

The overbased material

As stated above, the essential materials for preparing an overbased product are (1) the organic material to be overbased, (2) an inert, non-polar organic solvent for the organic material, (3) a metal base, (4) a promoter, and (5) an acidic material. In this example, these materials are (1) calcium petrosulfonate, (2) mineral oil, (3) calcium hydroxide, (4) a mixture of methanol, isobutanol, and n-pentanol, and (5) carbon dioxide.

A reaction mixture of 1305 grams of calcium sulfonate having a metal ratio of 2.5 dissolved in mineral oil, 220 grams of methyl alcohol, 72 grams of isobutanol, and 38 grams of n-pentanol is heated to 35° C. and subjected to the following operating cycle four times: mixing with 143 grams of 90% calcium hydroxide and treating the mixture with carbon dioxide until it has a base number of 32–39. The resulting product is then heated to 155° C. during a period of 9 hours to remove the alcohols and then filtered at this temperature. The filtrate is a calcium overbased petrosulfonate having a metal ratio of 12.2.

Conversion to a colloidal disperse system

A mixture of 150 parts of the overbased material, 15 parts of methyl alcohol, 10.5 parts of n-pentanol and 45 parts of water is heated under reflux conditions at 71°–74° C. for 13 hours. The mixture becomes a gel. It is then heated to 144° over a period of 6 hours and diluted with 126 parts of mineral oil having a viscosity of 2000 SUS at 100° F. and the resulting mixture heated at 144° C. for an additional 4.5 hours with stirring. This thickened product is a colloidal disperse system of the type contemplated by the present invention.

The disperse systems of the invention are characterized by three essential components: (A) solid, metal-containing particles formed in situ, (B) an inert, non-polar, organic liquid which functions as the disperse medium, and (C) an organic compound which is soluble in the disperse medium and the molecules of which are characterized by a hydrophobic portion and at least one polar substituent. In the colloidal disperse system described immediately above, these components are as follows: (A) calcium carbonate in the form of solid particles, (B) mineral oil, and (C) calcium petrosulfonate.

From the foregoing example, it is apparent that the solvent for the material which is overbased becomes the colloidal disperse medium or a component thereof. Of course, mixtures of other inert liquids can be substituted for the mineral oil or used in conjunction with the mineral oil prior to forming the overbased material. Moreover, after the overbased material is prepared, additional liquid material, e.g., a plasticizer for the resin can be added if desired, to form a part of the disperse medium.

It is also readily seen that the solid, metal-containing particles formed in situ possess the same chemical composition as would the reaction products of the metal base and the acidic material used in preparing the overbased materials. Thus, the actual chemical identity of the metal containing particles formed in situ depends upon both the particular metal base or bases employed and the particular acidic material or materials reacted therewith. For example, if the metal base used in preparing the overbased material were barium oxide and if the acidic material was a mixture of formic and acetic acids, the metal-containing particles formed in situ would be barium formates and barium acetates.

However, the physical characteristics of the particles formed in situ in the conversion step are quite different from the physical characteristics of any particles present in the homogeneous, single-phase overbased material which is subjected to the conversion. Particularly, such physical characteristics as particle size and structure are quite different. The solid, metal-containing particles of the colloidal disperse systems are of a size sufficient for detection by X-ray diffraction. The overbased materials prior to conversion are not characterized by the presence of these detectable particles.

X-ray diffraction and electron microscope studies have been made of both overbased organic materials and colloidal disperse systems prepared therefrom. These studies establish the presence in the disperse systems of the solid, metal-containing salts. For example, in the disperse system prepared hereinabove, the calcium carbonate is present as solid calcium carbonate having a particle size of about 40 to 50 A. (unit particle size) and interplanar spacing ($d$ A.) of 3.035. But X-ray diffraction studies of the overbased material from which it was prepared indicate the absence of calcium carbonate of this type. In fact, calcium carbonate present as such, if any, appears to be amorphous and in solution. While applicant does not intend to be bound by any theory offered to explain the changes which accompany the conversion step, it appears that conversion permits particle formation and growth. That is, the amorphous, metal-containing apparently dissolved salts or complexes present in the overbased material form solid, metal-containing particles which by a process of particle growth becomes colloidal particles. Thus, in the above example, the dissolved amorphous calcium carbonate salt or complex is transformed into solid particles which then "grow." In this example, they grow to a size of 40 to 50 A. In many cases, these particles apparently are crystallites. Regardless of the correctness of the postulated mechanism for in situ particle formation the fact remains that no particles of the type predominant in the disperse systems are found in the overbased materials from which they are prepared. Accordingly, they are unquestionably formed in situ during conversion.

As these solid metal-containing particles formed in situ come into existence, they do so as pre-wet, pre-dispersed solid particles which are inherently uniformly distributed throughout the other components of the disperse system. The liquid disperse medium containing these pre-wet dispersed particles is readily incorporated into various polymeric compositions thus facilitating the uniform distribution of the particles throughout the polymeric resin composition. This pre-met, pre-dispersed character of the solid metal-containing particles resulting from their in situ formation is, thus, an extremely important feature of the disperse systems.

In the foregoing example, the third component of the disperse system (i.e., the organic compound which is soluble in the disperse medium and which is characterized by molecules having a hydrophobic portion and a polar substituent) is calcium petrosulfonate,

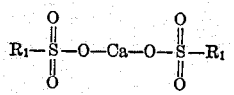

wherein $R_1$ is the residue of the petrolesulfonic acid. In this case, the hydrophobic portion of the molecule is the hydrocarbon moiety of petrosulfonic, i.e., —$R_1$. The polar substituent is the metal salt moiety,

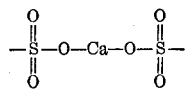

The hydrophobic portion of the organic compound is a hydrocarbon radical or a substantially hydrocarbon radical containing at least about twelve aliphatic carbon atoms. Usually the hydrocarbon portion is an aliphatic or cycloaliphatic hydrocarbon radical although aliphatic or cycloaliphatic substituted aromatic hydrocarbon radicals are also suitable. In other words, the hydrophobic portion of the organic compound is the residue of the organic material which is overbased minus its polar substituents. For example, if the material to be overbased is a carboxylic acid, sulfonic acid, or phosphorus acid, the hydrophobic portion is the residue of these acids which would result from the removal of the acid functions. Similarly, if the material to be overbased is a phenol, a nitro-substituted polyolefin, or an amine, the hydrophobic portion of the organic compound is the radical resulting from the removal of the hydroxyl, nitro, or amino group respectively. It is the hydrophobic portion of the molecule which renders the organic compound soluble in the solvent used in the overbasing process and later in the disperse medium.

Obviously, the polar portion of these organic compounds are the polar substituents such as the acid salt moiety discussed above. When the material to be overbased contains polar substituents which will react with the basic metal compound used in overbasing, for example, acid groups such as carboxy, sulfino, hydroxysulfonyl, and phosphorus acid groups or hydroxyl groups, the polar substituent of the third component is the polar group formed from the reaction. Thus, the polar substituent is the corresponding acid metal salt group or hydroxyl group metal derivative, e.g., an alkali or alkaline earth metal sulfonate, carboxylate, sulfinate, alcoholate, or phenate.

On the other hand, some of the materials to be overbased contained polar substituents which ordinarily do not react with metal bases. These substituents include nitro, amino, ketocarboxyl, carboalkoxy, etc. In the disperse systems derived from overbased materials of this type the polar substituents in the third component are unchanged from their identity in the material which was originally overbased.

The identity of the third essential component of the disperse system depends upon the identity of the starting materials (i.e., the material to be overbase and the metal base compound) used in preparing the overbased material. Once the identity of these starting materials is known, the identity of the third component in the colloidal disperse system is automatically established. Thus, from the identity of the original material, the identity of the hydrophobic portion of the third component in the disperse system is readily established as being the residue of that material minus the polar substituents attached thereto. The identity of the polar substituents on the third component is established as a matter of chemistry. If the polar groups on the material to be overbased undergo reaction with the metal base, for example, if they are acid functions, hydroxy groups, etc., the polar substituent in the final product will correspond to the reaction product of the original substituent and the metal base. On the other hand, if the polar substituent in the material to be overbased is one which does not react with metal bases, then the polar substituent of the third component is the same as the original substituent.

As previously mentioned, this third component can orient itself around the metal-containing particles to form micellar colloidal particles. Accordingly, it can exist in the disperse system as an individual liquid component dissolved in the disperse medium or it can be associated with the metal-containing particles as a component of micellar colloidal particles.

Preparation of the resinous compositions

The specific means by which a given disperse system is incorporated into a particular resinous composition does not constitute a critical feature of the present invention. Those skilled in the art constantly prepare resinous compositions containing an extremely diverse group of additives, both solid and liquid, through a variety of known techniques. Fillers, pigments, stabilizers, plasticizers, thixotropic agents, etc., are routinely made a part of polymeric resinous compositions. Therefore, a variety of suitable methods for incorporating the disperse systems into resinous compositions are obvious to those skilled in the art. For example, as the colloidal disperse systems of the invention are liquids or semi-liquids (i.e., gels) they can be mixed directly with a plastisol or organisol prior to "curing." Or the disperse systems can be pre-mixed with all or part of any other liquid additive or component (e.g., plasticizers, solvents, stabilizers, etc.) used in the resinous compositions and this resulting mixture incorporated into the polymeric composition. In other words, these disperse systems are mixed with the remaining components of a polymeric composition in the same manner as any other thixotropic agent or additive. Illustrative technique for incorporating the disperse systems into polymeric materials are illustrated in the examples presented hereinafter.

The disperse systems are added to the resinous composition in an amount of from about 0.1% to about 25% by weight based on the weight of polymer present in the composition. Preferably, from about 2% to about 15% will be used. Particularly useful compositions contain from about 4% to about 8% of the disperse systems. The optimum amount for any given composition depends upon the particular resin or combination of resins contained in the composition, the amount and type of the other components present, the particular use to which the composition is to be used, and the particular disperse system. However, using the above concentrations as guidelines, it is well within the skill of the art to determine the optimum amount of a given disperse system for a particular resinous composition having a particular use.

The following examples illustrate various overbased materials, colloidal disperse systems prepared from these overbased materials, and resinous compositions containing various colloidal disperse systems. Unless otherwise indicated, "percentages" and "parts" refer to percent by weight and parts by weight. Where temperatures exceed the boiling points of the components of the reaction mixture, obviously reflux conditions are employed unless the reaction products are being heated to remove volatile components.

Examples 1 through 43 are directed to the preparation of overbased materials illustrative of the types which can be used to prepare the non-Newtonian colloidal disperse systems used in the polymeric resinous compositions of the invention. The term "naphtha" as used in the following examples refers to petroleum distillates boiling in the range of about 90° C. to about 150° C., and usually designated Varnish Maker's and Painter's Naphtha.

Example 1

To a mixture of 3,245 grams (12.5 equivalents) of a mineral oil solution of barium petroleum sulfonate (sulfate ash of 7.6%), 32.5 parts of octylphenol, 197 parts of water, there is added 73 parts of barium oxide within a period of 30 minutes at 57°–84° C. The mixture is heated at 100° C. for 1 hour to remove substantially all water and blown with 75 parts of carbon dioxide at 133° to 170° C. within the period of 3 hours. A mixture of 1,000 grams of the above carbonated intermediate product, 121.8 parts of octylphenol, and 234 parts of barium hydroxide is heated at 100° C. and then at 150° C. for 1 hour. The mixture is then blown with carbon dioxide at 150° C. for 1 hour at a rate of 3 cubic feet per hour. The carbonated product is filtered and the filtrate is found to have a sulfate ash content of 39.8% and a metal ratio of 9.3.

Example 2

To a mixture of 3,245 grams (12.5 equivalents) of barium petroleum sulfonate, 1,460 grams (7.5 equivalents) of heptylphenol, and 2,100 grams of water in 8,045 grams of mineral oil there is added at 180° C. 7,400 grams (96.5 equivalents) of barium oxide. The addition of barium oxide causes the temperature to rise to 143° C. which temperature is maintained until all the water has been distilled. The mixture is then blown with carbon dioxide until it is substantially neutral. The product is diluted with 5,695 grams of mineral oil and filtered. The filtrate is found to have a barium sulfate ash content of 30.5% and a metal ratio of 8.1. Another inert liquid such as benzene, toluene, heptene, etc., can be substituted for all or part of the mineral oil.

Example 3

A mixture of 1,285 grams (1.0 equivalent) of 40% barium petroleum sulfonate and 500 milliliters (12.5 equivalents) of methanol is stirred at 55–60° C. while 301 grams (3.9 equivalents) of barium oxide is added portionwise over a period of 1 hour. The mixture is stirred an additional 2 hours at 45–55° C., then treated with carbon dioxide at 55–65° C. for 2 hours. The resulting mixture is freed of methanol by heating to 150° C. The residue is filtered through a siliceous filter aid, the clear, brown filtrate analyzing as: sulfate ash, 33.2%; slightly acid; metal ratio, 4.7.

Example 4

A stirred mixture of 57 grams (0.4 equivalent) of nonyl alcohol and 3.01 grams (3.9 equivalents) of barium oxide is heated at 150–175° C. for an hour, then cooled to 80° C. whereupon 400 grams (12.5 equivalents) of methanol is added. The resultant mixture is stirred at 70–75° C. for 30 minutes, then treated with 1,285 grams (1.0 equivalent) of 40% barium petroleum sulfonate. This mixture is stirred at reflux temperature for an hour, then treated with carbon dioxide at 60–70° C. for 2 hours. The mixture is then heated to 160° C. at a pressure of 18 millimeters of mercury and thereafter filtered. The filtrate is a clear, brown oily material having the following analysis: sulfate ash, 32.5%; neutralization number—nil; metal ratio, 4.7.

Example 5

(a) To a mixture of 1,145 grams of a mineral oil solution of a 40% solution of barium mahogany sulfonates (1.0 equivalent) and 100 grams of methyl alcohol at 55° C., there is added 220 grams of barium oxide while the mixture is being blown with carbon dioxide at a rate of 2 to 3 cubic feet per hour. To this mixture there is added an additional 78 grams of methyl alcohol and then 460 grams of barium oxide while the mixture is blown with carbon dioxide. The carbonated product is heated to 150° C. for 1 hour and filtered. The filtrate is found to have a barium sulfate ash content of 53.8% and a metal ratio of 8.9.

(b) A carbonated basic metal salt is prepared in accordance with the procedure of (a) except that a total of 16 equivalents of barium oxide is used per equivalent of the barium mahogany sulfonate. The product possesses a metal ratio of 13.4.

Example 6

A mixture of 520 parts (by weight) of a mineral oil, 480 parts of a sodium petroleum sulfonate (molecular weight of 480), and 84 parts of water is heated at 100° C. for 4 hours. The mixture is then heated with 86 parts of a 76% aqueous solution of calcium chloride and 72 parts of lime (90% purity) at 100° C. for 2 hours, dehydrated by heating to a water content of less than 0.5%, cooled to 50° C., mixed with 130 parts of methyl alcohol, and then blown with carbon dioxide at 50° C. until substantially neutral. The mixture is then heated to 150° C. to remove the methyl alcohol and water and the resulting oil solution of the basic calcium sulfonate filtered. The filtrate is found to have a calcium sulfate ash content of 16% and a metal ratio of 2.5.

A mixture of 1,305 grams of the above carbonated calcium sulfonate, 930 grams of mineral oil, 220 grams of methyl alcohol, 72 grams of isobutyl alcohol, and 38 grams of primary amyl alcohol is prepared, heated to 35° C., and subjected to the following operating cycle 4 times: mixing with 143 grams of 90% calcium hydroxide and treating the mixture with carbon dioxide until it has a base number of 32–39. The resulting product is then heated to 155° C. during a period of 9 hours to remove the alcohols and filtered through a siliceous filter aid at this temperature. The filtrate has a calcium sulfate ash content of 39.5% and a metal ratio of 12.2.

Example 7

A basic metal salt is prepared by the procedure described in Example 6 except that the slightly basic calcium sulfonate having a metal ratio of 2.5 is replaced with a mixture of that calcium sulfonate (280 parts by weight) and tall oil acid (970 parts by weight having an equivalent weight of 340) and that the total amount of calcium hydroxide used is 930 parts by weight. The resulting highly basic metal salt of the process has a calcium sulfate ash content of 48%, a metal ratio of 7.7, and an oil content of 31%.

Example 8

A highly basic metal salt is prepared by the procedure of Example 7 except that the slightly basic calcium sulfonate starting material having a metal ratio of 2.5 is replaced with tall oil acids (1,250 parts by weight, having an equivalent weight of 340) and the total amount of calcium hydroxide used is 772 parts by weight. The resulting highly basic metal salt has a metal ratio of 5.2, a calcium sulfate ash content of 41%, and an oil content of 33%.

Example 9

A normal calcium mahogany sulfonate is prepared by metathesis of a 60% oil solution of sodium mahogany sulfonate (750 parts by weight) with a solution of 67 parts of calcium chloride and 63 parts of water. The reaction mass is heated for 4 hours at 90 to 100° C. to effect the conversion of the sodium mahogany sulfonate to calcium mahogany sulfonate. Then 54 parts of lime is added and the whole is heated to 150° C. over a period of 5 hours. When the whole has cooled to 40° C., 98 parts of methanol is added and 152 parts of carbon dioxide is introduced over a period of 20 hours at 42–43° C. Water and alcohol are then removed by heating the mass to 150° C. The residue in the reaction vessel is diluted with 100 parts of low viscosity mineral oil. The filtered oil solution of the desired carbonated calcium sulfonate overbased material shows the following analysis: sulfate ash content, 16.4%; neutralization number, 0.6 (acidic); and a metal ratio of 2.50. By adding barium or calcium oxide or hydroxide to this product with subsequent carbonation, the metal ratio can be increased to a ratio of 3.5 or greater as desired.

Example 10

A mixture of 880 grams (0.968 mole) of a 57.5% oil solution of the calcium sulfonate of tridecylbenzene bottoms (the bottoms constitute a mixture of mono-, di-, and tri-decylbenzene), 149 grams of methanol, and 59 grams (1.58 equivalents) of calcium hydroxide are introduced into a reaction vessel and stirred vigorously. The whole is heated to 40–45° C. and carbon dioxide is introduced for 0.5 hour at the rate of 2 cubic feet per hour. The carbonated reaction mixture is then heated to 150° C. to remove alcohol and any water present, and the residue is filtered for purposes of purification. The product, a 61% oil solution of the desired overbased carbonated calcium sulfonate material shows the following analysis: ash content, 16.8%; neutralization number, 7.0 (acidic); and metal ratio, 2.42. By further carbonation in the presence of an alkali or alkaline earth metal oxide, hydroxide, or alkoxide, the metal ratio can readily be increased to 3.5 or greater.

Example 11

A mixture of 2,090 grams (2.0 equivalents) of a 45% oil solution of calcium mahogany sulfonate containing 1% of water, 74 grams (2.0 equivalents) of calcium hydroxide, and 251 grams of ethylene glycol is heated for 1 hour at 100° C. Carbon dioxide is then bubbled through the mixture at 40–45° C. for 5.5 hours. The ethylene glycol and any water present are removed by heating the mixture to a temperature of 185° C. at 10.2 millimeters of mercury. The residue is filtered yielding the desired overbased calcium sulfonate material, having the following analysis: sulfate ash, 12.9%; neutralization number 5.0 (acidic); and a metal ratio of 2.0 which can be increased to 3.5 or greater as desired by carbonation in the presence of calcium oxide or hydroxide.

Example 12

A mixture comprising 1,595 parts of the overbased material of Example 9 (1.54 equivalents based on sulfonic acid anion), 167 parts of the calcium phenate prepared as indicated below (0.19 equivalent), 616 parts of mineral oil, 157 parts of 91% calcium hydroxide (3.86 equivalents), 288 parts of methanol, 88 parts of isobutanol, and 56 parts of mixed isomeric primary-amyl alcohols (containing about 65% normal amyl, 3% isoamyl and 32% of 2-methyl-1-butyl alcohols) is stirred vigorously at 40° C. and 25 parts of carbon dioxide is introduced over a period of 2 hours at 40–50° C. Thereafter, three additional portions of calcium hydroxide, each amounting to 1.57 parts, are added and each such addition is followed by the introduction of carbon dioxide as previously illustrated. After the fourth calcium hydroxide addition and the carbonation step is completed, the reaction mass is carbonated for an additional hour at 43–47° C. to reduce neutralization number of the mass to 4.0 (basic). The substantially neutral, carbonated reaction mixture is freed from alcohol and any water of reaction by heating to 150° C. and simultaneously blowing it with nitrogen. The residue in the reaction vessel is filtered. The filtrate, an oil solution of the desired substantially neutral, carbonated calcium sulfonate overbased material of high metal ratio, shows the following analysis: sulfate ash content, 41.11%; neutralization number 0.9 (basic); and a metal ratio of 12.55.

The calcium phenate used above is prepared by adding 2,250 parts of mineral oil, 960 parts (5 moles) of heptylphenol, and 50 parts of water into a reaction vessel and stirring at 25° C. The mixture is heated to 40° C. and 7 parts of calcium hydroxide and 231 parts (7 moles) of 91% commercial paraformaldehyde is added over a period of 1 hour. The whole is heated to 80° C. and 200 additional parts of calcium hydroxide (making a total of 207 parts of 5 moles) is added over a period of 1 hour at 80–90° C. The whole is heated to 150° C. and maintained at that temperature for 12 hours while nitrogen is blown through the mixture to assist in the removal of water. If foaming is encountered, a few drops of polymerized dimethyl silicone foam inhibitor may be added to control the foaming. The reaction mass is then filtered. The filtrate, a 33.6% oil solution of the desired calcium phenate of heptylphenol-formaldehyde condensation product is found to contain 7.56% sulfate ash.

Example 13

A mixture of 574 grams (0.5 equivalent) of 40% barium petroleum sulfonate, 98 grams (1.0 equivalents) of furfuryl alcohol, and 762 grams of mineral oil is heated with stirring at 100° C. for an hour, then treated portionwise over a 15-minute period with 230 grams (3.0 equivalents) of barium oxide. During this latter period, the temperature rises to 120° C. (because of the exothermic nature of the reaction of barium oxide and the alcohol). The mixture then is heated to 150–160° C. for an hour, and treated subsequently at this temperature for 1.5 hours with carbon dioxide. The material is concentrated by heating to a temperature of 150° C. at a pressure of 10 millimeters of mercury and thereafter filtered to yield a clear, oil-soluble filtrate having the following analysis: sulfate ash content, 21.4%; neutralization number, 2.6 (basic); and a metal ratio of 6.1.

Example 14

An overbased material is prepared by the procedure of Example 6 except that the slightly basic calcium sulfonate starting material has a metal ratio of 1.6, the amount of the calcium sulfonate used is 1050 parts by weight), and the total amount of lime used is 630 parts. The resulting metal salt has a calcium sulfate ash content of 40%, a metal ratio of 16, and an oil content of 35%.

Example 15

To a mixture of 1614 parts (3 equivalents) of a polyisobutenyl succinic anhydride (prepared by the reaction of a chlorinated polyisobutene having an average chlorine content of 4.3% and an average of 67 carbon atoms with maleic anhydride at about 200° C.), 4313 parts of mineral oil, 345 parts (1.8 equivalents of heptylphenol, and 200 parts of water, at 80° C., there is added 1,038 parts (24.7 equivalents) of lithium hydroxide monohydrate over a period of 0.75 hour while heating to 105° C. Isooctanol (75 parts) is added while the mixture is heated to 150° C. over a 1.5-hour period. The mixture is maintained at 150–170° C. and blown with carbon dioxide at the rate of 4 cubic feet per hour for 3.5 hours. The reaction mixture is filtered through a filter aid and the filtrate is the desired product having a sulfate ash content of 18.9% and a metal ratio of 8.0.

Example 16

The procedure of Example 6 is repeated except that an equivalent amount of sodium hydroxide is used in lieu of the calcium oxide. The product is the corresponding sodium overbased material.

Example 17

A mixture of 244 parts (0.87 equivalent) of oleic acid, 180 parts of primary isooctanol, and 400 parts of mineral oil is heated to 70° C. whereupon 172.6 parts (2.7 equivalents) of cadmium oxide is added. The mixture is heated for 3 hours at a temperature of 150° to 160° C. while removing water. Barium hydroxide monohydrate (324 parts, 3.39 equivalents) is then added to the mixture over a period of 1 hour while continuing to remove water by means of a side-arm water trap. Carbon dioxide is blown through the mixture at a temperature of from 150–160° C. until the mixture is slightly acidic to phenolphthalein. Upon completion of the carbonation, the mixture is stripped to a temperature of 150° C. at 35 mm. of mercury to remove substantially all the remaining water and alcohol. The residue is the desired overbased product containing both barium and cadmium metal.

Example 18

The procedure of Example 13 is repeated except that the barium sulfonate is replaced by an equivalent amount of potassium sulfonate, and potassium oxide is used in lieu of the barium oxide resulting in the preparation of the corresponding potassium overbased material.

Example 19

A sulfoxide is prepared by treating polyisobutylene (average molecular weight 750) with 47.5% of its weight of $SOCl_2$ for 4.5 hours at 220° C. A mixture of 787 grams (1.0 equivalent) of this sulfoxide, 124 grams (0.6 equivalent) of diisobutylphenol, 550 grams of mineral oil, and 200 grams of water was warmed to 70° C. and treated with 360 grams (4.0 equivalents) of barium oxide. This mixture is heated at reflux temperature for 1 hour and treated at 150° C. with carbon dioxide until the mixture is substantially neutral and thereafter filtered to yield a clear, oil-soluble liquid having the following analysis: sulfate ash, 22.8%; neutralization number, 5.8 (basic); and metal ratio, 5.8.

Example 20

To a mixture of 268 grams (1.0 equivalent) of oleyl alcohol, 675 grams of mineral oil, 124 grams (0.6 equivalent) of diisobutylphenol, and 146 grams of water, at 70° C. there is added 308 grams (4.0 equivalents) of barium oxide. This mixture is heated at reflux temperature for 1 hour, then at 150° C. while bubbling carbon dioxide therethrough until substantial neutrality of the mixture is achieved. The resulting reaction mass is filtered resulting in a clear, brown, oil-soluble filtrate having the following analysis: sulfate ash content, 29.8%; neutralization number 2.6 (basic); and metal ratio, 6.0.

Example 21

To a mixture of 423 grams (1.0 equivalent) of sperm oil, 124 grams (0.6 equivalent) of heptylphenol, 500 grams of mineral oil, and 150 grams of water there are added at 70° C. 308 grams (4.0 equivalent) of barium oxide. This mixture is heated at reflux temperature for 1 hour, dried by heating at about 150° C. and thereafter carbonated by treatment with carbon dioxide at the same temperature until the reaction mass was slightly acidic. Filtration yields a clear, light brown, non-viscous overbased liquid material having the following analysis: sulfate ash content, 32.0%; neutralization number 0.5 (basic); metal ratio, 6.5.

Example 22

To a mixture of 174 grams (1.0 equivalent) of N-octadecyl propylene diamine, 124 grams (0.6 equivalent) of diisobutylphenol, 766 grams of mineral oil, 146 grams of water, there are added 306 grams (4.0 equivalents) of barium oxide and the whole is refluxed for an hour. Water is subsequently removed by raising the temperature to 150° C. and thereafter carbon dioxide is bubbled therethrough while maintaining this temperature. When the reaction mass is substantially neutral, carbon dioxide addition is ceased and the reaction mass filtered producing a clear, oil-soluble liquid having the following analysis: sulfate ash content, 28.9%; neutralization number, 2.5 (basic); metal ratio, 5.8.

Example 23

A mixture of 6000 grams of a 30% solution of barium petroleum sulfonate (sulfate ash 7.6%), 348 grams of para-tertiary butylphenol, and 2911 grams of water are heated to a temperature of 60° C. While slowly adding 1100 grams of barium oxide and raising the temperature to 94–98° C. The temperature is held within this range for about 1 hour and then slowly raised over a period of 7½ hours to 150° C. and held at this level for an additional hour assuring substantial removal of all water. The resulting overbased material is a brown liquid having the following analysis: sulfate ash content, 26.0%; metal ratio, 4.35.

This product is then treated with $SO_2$ until 327 grams of the mass combined with the overbased material. The product thus obtained has a neutralization number of zero. The $SO_2$-treated material was liquid and brown in color.

One thousand grams of the $SO_2$-treated overbased material produced according to the preceding paragraph is mixed with 286 grams of water and heated to a temperature of about 60° C. Subsequently, 107.5 grams of barium oxide are added slowly and the temperature is maintained at 94–98° C. for 1 hour. Then the total reaction mass is heated to 150° C. over a 1⅙ hour period and held there for a period of 1 hour. The resulting overbased material is purified by filtration, the filtrate being the brown, liquid overbased material having the following analysis: sulfate ash content, 33.7%; basic number, 38.6; metal ratio, 6.3.

Example 24

(a) A polyisobutylene having a molecular weight of 700–800 is prepared by the aluminum chloride-catalyzed polymerization of isobutylene at 0–30° C., is nitrated with a 10% excess (1.1 moles) of 70% aqueous nitric acid at 70–75° C. for 4 hours. The volatile components of the product mixture are removed by heating to 75° C. at a pressure of 75 mm. of mercury. To a mixture of 151 grams (0.19 equivalent) of this nitrated polyisobutylene, 113 grams (0.6 equivalent) of heptylphenol, 155 grams of water, and 2,057 grams of mineral oil there is added at 70° C. 612 grams (8 equivalents) of barium oxide. This mixture is heated at 150° C. for an hour, then treated with carbon dioxide at this same temperature until the mixture is neutral (phenolphthalein indicator; ASTM D–974–53T procedure at 25° C.; a measurement of the degree of conversion of the metal reactant, i.e., barium oxide, bicarbonation). The product mixture is filtered and the filtrate found to have the following analysis: sulfate ash content, 27.6%; percent N, 0.06; and metal ratio, 9.

(b) A mixture of 611 grams (0.75 mole) of the nitrated polyisobutylene of Example 1, 96 grams (0.045 mole) of heptylphenol, 2104 grams of mineral oil, 188 grams of water and 736 grams (4.8 moles) of barium oxide was heated at reflux temperature for an hour. The water was vaporized and carbon dioxide passed into the mixture at 150° C. until the mixture was no longer basic. This carbonated mixture was filtered and the clear fluid filtrate showed the following analysis: sulfate ash content, 26.3%; percent N, 0.15; base No. 2.4; metal ratio, 6.7.

Example 25

(a) A mixture of 1 equivalent of a nitrated polypropylene having a molecular weight of about 3000, 2 equivalents of cetylphenol, mineral oil, and 3 equivalents of barium hydroxide is heated at reflux temperature for 1 hour. The temperature is then raised to 150° C. and carbon dioxide is bubbled through the mixture at this temperature. The reaction product is filtered and the filtrate is the desired overbased material.

(b) A solvent - refined, acid - treated Pennsylvania petroleum lubricating oil is nitrated by treatment with 1.5 moles of 70% aqueous nitric acid at 54–78° C. for 8 hours. After removal of volatile components of the product mixture by heating at 103° C. at a pressure of 15 mm. of mercury for 2 hours, a 787 gram portion (1.0 equivalent) of the nitrated product is treated with 2 grams (0.3 equivalent) of heptylphenol, 495 grams of mineral oil, 90 grams of water, and 378 grams (5 equivalents) of barium oxide. This mixture is heated at reflux temperature for an hour, then freed of water by distillation. The temperature is increased to 150° C. whereupon carbon dioxide is bubbled into the mixture until it is neutral. Filtration yields a clear filtrate with the following analysis: percent sulfate ash, 27.6; percent N, 0.5; and metal ratio, 3.1.

Example 26

(a) A mixture of 1000 parts of mineral oil, 2 equivalents of barium hydroxide, 1 equivalent of 1-nitro-3-octadecyl-cyclohexane and 1 equivalent (i.e., 0.5 mole) of 4,4′-methylene-bis (heptylphenol) is carbonated at 100–150° C. for 4 hours until the reaction mixture is substantially neutral to phenolphthalein indicator. The reaction mass is filtered and the desired product is the filtrate.

(b) A mixture of 1000 parts of mineral oil, 3 equivalents of lithium hydroxide, 1 equivalent of nitrated polyisobutene (prepared by mixing 500 parts by weight of polyisobutene having an average molecular weight of 1000 and 62.5 parts of 67% aqueous nitric acid at 65–70° C. for 11 hours) and para-butylphenol (1 equivalent) is carbonated according to the technique of (a) above to produce the corresponding lithium overbased material.

Example 27

A copolymer of isobutene and piperylene (weight ratio of 98.2) having a molecular weight of about 2000, is nitrated by the procedure used in the preceding example for the nitration of polyisobutene. An overbased product is then prepared from this nitrated reactant by mixing 1 equivalent thereof with 1 equivalent of α-butyl-β-naphthol and 7 equivalents barium hydroxide, diluting the mixture with mineral oil to a 50% oil mixture, and then carbonating the mixture at 120°–160° C. until it is substantially neutral to phenolphthalein indicator. The reaction product is filtered and the filtrate is the desired overbased product.

Example 28

A mixture of 630 grams (2 equivalents) of a rosin amine (consisting essentially of dehydroabietyl amine) having a nitrogen content of 44% and 245 grams (1.2 equivalents) of heptylphenol having a hydroxyl content of 8.3% is heated to 90° C. and thereafter mixed with 230 grams (3 equivalents) of barium oxide at 90–140° C. The mixture is purged with nitrogen at 140° C. A 600 gram portion is diluted with 400 grams of mineral oil and filtered. The filtrate is blown with carbon dioxide, diluted with benzene, heated to remove the benzene, mixed with xylene, and filtered. The filtrate, a 20% xylene solution of the product has a barium sulfate ash content of 25.1%, a nitrogen content of 2%, and a reflux base number of 119. (The basicity of the metal composition is expressed in terms of milligrams of KOH which are equivalent to one gram of the composition. For convenience, the basicity thus determined is referred to in the specification as a "reflux base number."

Example 29

An amine-aldehyde condensation product is obtained as follows: formaldehyde (420 grams, 14 moles) is added in small increments to a mixture comprising N-octadecylpropylenediamine (1392 grams, 4 moles), mineral oil (300 grams), water (200 grams), and calcium hydroxide (42 grams—condensation catalyst) at the reflux temperature, i.e., 100°–105° C. The rate of addition of formaldehyde is such as to avoid excessive foaming. The mixture is heated at reflux temperature for 1 hour, slowly heated to 155° C., and blown with nitrogen at 150°–155° C. for 2 hours to remove all volatile components. It is then filtered. The filtrate, 93% of the theoretical yield, is 65.4% oil solution of the amine-aldehyde condensation product having a nitrogen content of 2.4%.

A 1,850 gram portion (3.2 equivalents of nitrogen) is mixed with 1,850 grams of heptylphenol (0.97 equivalent), 1,485 grams of mineral oil, and 1,060 grams of 90% pure barium oxide (12.6 equivalents) and heated to 70° C. Over a period of 1 hour, 500 grams of water is added while maintaining the temperature in the range of 70–100° C. The mixture is heated at 110° to 115° C. for 4.7 hours and thereafter to 150° C. While maintaining the temperature within the range of 140–150° C., the reaction mixture is carbonated and subsequently filtered. The filtrate is a 57.8% oil solution of the overbased amine-aldehyde condensation product having a nitrogen content of 0.87% and a barium sulfate ash content of 29.5%.

Example 30

A partially acylated polyamine reactant is prepared as follows: a mixture (565 parts by weight) of an alkylene amine mixture consisting of triethylene tetramine and diethylene triamine in weight ratio of 3:1 is added at 20°–80° C. to a mixture of naphthenic acid having an acid number of 180 (1,270 parts) and oleic acid (1,110 parts). The total quantity of the two acids used is such as to provide 1 equivalent of acid for each two equivalents of the amine mixture used. The reaction is exothermic. The mixture is blown with nitrogen while it is being heated to 240° C. in 4.5 hours and thereafter heated at this temperature for 2 hours. Water is collected as the distillate.

To the above residue, ethylene oxide (140 parts) is added at 170°–180* C. within a period of 2 hours while nitrogen is bubbled through the reaction mixture. Nitrogen blowing is continued for an additional 15 minutes and the reaction mixture then diluted with 940 parts of xylene to a solution containing 25% by weight of xylene. The resulting solution has a nitrogen content of 5.4% and a base number of 82 at pH of 4, the latter being indicative of free amino groups.

A 789 gram portion of the above xylene solution (3 equivalents of nitrogen) is heated to 150° C. at a pressure of 2 millimeters of mercury to distill off xylene and is then mixed with 367 grams of heptylphenol (having a hydroxyl content of 8.3%; 1.8 equivalents). To this mixture there is added 345 grams (4.5 equivalents) of barium oxide in small increments at 90°–111° C. The mixture is heated at 90°–120° C. for 2.5 hours and blown with carbon dioxide for 1.75 hours. It is diluted with 130 grams of xylene and then heated at 150° C. for 3.5 hours. It is then diluted with 20% by weight of xylene and filtered. The filtrate has a barium sulfate ash content of 33.2%, a nitrogen content of 3.52% and a reflux base number of 134.

Example 31

To a mixture of 408 grams (2 equivalents) of heptylphenol having a hydroxy content of 8.3% and 264 grams of xylene there is added 383 grams (5 equivalents) of barium oxide in small increments at 85°–110° C. Thereafter, 6 grams of water is added and the mixture is carbonated at 100°–130° C. and filtered. The filtrate is heated to 100° C. diluted with xylene to a 25% xylene solution. This solution has a barium sulfate ash content of 41% and a reflux base number of 137.

Example 32

A mixture of 5846 parts (4.0 equivalents) of a neutral calcium sulfonate having a calcium sulfate ash content of 4.68% (66% mineral oil), 464 parts (2.4 equivalents) of heptylphenol, and 3.4 parts of water is heated to 80° C. whereupon 1,480 parts (19.2 equivalents) of barium oxide is added over a period of 0.6 hour. The reaction is exothermic and the temperature of the reaction mixture reaches 100° C. The mixture is heated to 150° C. and carbonated at this temperature. During the carbonation, 24 parts of barium chloride were added to the mixture. Oil was removed from the reaction mixture during the carbonation procedure. Carbonation is continued at this temperature until the mixture has a base number (phenolphthalein) of 80. Octyl alcohol (164 parts) and a filter aid are added to the mixture and the mixture is filtered while hot. The filtrate is the desired overbased barium bright stock sulfonate having a barium sulfate ash content of 26.42, a metal ratio of 4.6 and a reflux base number of 104.

Example 33

Following the procedure for preparing barium and calcium overbased sulfonates exemplified above, sodium mahogany sulfonate (0.26 equivalent), 1 equivalent of phenol, and 5.3 equivalents of strontium oxide are carbonated until the reaction mixture is almost neutral. The resulting overbased material is filtered, the filtrate being the desired product and having a metal ratio of 4.6.

Example 34

A barium overbased carboxylic acid is prepared by carbonating a mixture of 9.8 equivalents of barium hydroxide, 1 equivalent of heptylphenol, and 0.81 equivalent of a polyisobutene substituted succinic anhydride wherein the polyisobutenyl portion thereof has an average molecular weight of 1000.

Example 35

A mixture of 1000 parts by weight of a polyisobutene having a molecular weight of 1000 and 90 parts of phosphorus pentasulfide is prepared at room temperature, heated to 260° C. over 5 hours, and maintained at this temperature for an additional 5 hours. The reaction mass is then cooled to 106° C. and hydrolyzed by treatment with steam at this temperature for 5 hours. The hydrolyzed acid has a phosphorus content of 2.4%, a sulfur content of 2.8%. In a separate vessel, a mixture of oil and barium hydroxide is prepared by mixing 2200 parts of a mineral oil and 1150 parts of barium oxide at 88° C. and blowing the mixture with steam for 3 hours at 150° C. To this mixture there is added portionwise throughout a period of 3 hours, 1,060 parts of the above hydrolyzed acid while maintaining the temperature at 145°–150° C., and then 360 parts of heptylphenol is added over a 1.5 hour period. The resulting mixture is blown with carbon dioxide at the rate of 100 parts per hour for 3 hours at 150°–157° C. The carbonated product is mixed with 850 parts of a mineral oil and dried by blowing it with nitrogen at a temperature of 150° C. The dry product is filtered and the filtrate is diluted with mineral oil to a solution having a barium sulfate ash content of 25%. The final solution has a phosphorus content of 0.38%, a sulfur content of 0.48%, a neutralization number less than 5 (basic), a reflux base number of 109, and a metal ratio of 7.2.

Example 36

To a mixture of 268 grams (1.0 equivalent) of oleyl alcohol, 124 grams (0.6 equivalent) of heptylphenol, 988 grams of mineral oil, and 160 grams of water there is added 168 grams (4.0 equivalents) of lithium hydroxide monohydrate. The mixture is heated at reflux temperature for an hour and then carbonated at 150° C. until it is substantially neutral. The filtration of this carbonated mixture yields a liquid having a lithium sulfate content of 12.7%.

(B) To a mixture of 1614 parts (3 equivalents) of a polyisobutenyl succinic anhydride prepared by the reaction of a chlorinated polyisobutene having an average chlorine content of 4.3% and an average of 67 carbon atoms with maleic anhydride at about 200° C., 4,313 parts of mineral oil, 345 parts (1.8 equivalents) of heptylphenol, and 200 parts of water, at 80° C., there is added 1,038 parts (24.7 equivalents) of lithium hydroxide monohydrate over a period of 0.75 hour while heating to 105° C. Isooctanol (75 parts) is added while the mixture is heated to 150° C. in about 1.5 hours. The mixture is maintained at 150–170° C. and blown with carbon dioxide at the rate of 4 cubic feet per hour for 3.5 hours. The reaction mixture is filtered through a filter aid and the filtrate is the desired product having a sulfate ash content of 18.9 and a metal ratio of 8.

Example 37

A thiophosphorus acid is prepared as set forth in Example 35 above. A mixture of 890 grams of this acid (0.89 equivalent), 2,945 grams of mineral oil, 445 grams of heptylphenol (2.32 equivalents), and 874 grams of lithium hydroxide monohydrate (20.8 equivalents) formed by adding the metal base to the mineral oil solution of the acid and the heptylphenol over a 1.5 hour period maintaining the temperature at 100°–110° C. and thereafter drying at 150° C. for 2 hours, carbon dioxide is bubbled therethrough at the rate of 4 cubic feet per hour until the reaction mixture was slightly acidic to phenophthalein, about 3.5 hours, while maintaning the temperature within the range of 150–160° C. The reaction mixture is then filtered twice through a diatomaceous earth filter. The filtrate is the desired lithium overbased thio-phosphorus acid material having a metal ratio of 6.3

Example 38

(a) A reaction mixture comprising 2,442 grams (2.8 equivalents) of strontium petrosulfonate, 3,117 grams of mineral oil, 150 grams of isooctanol, and 910 grams of methanol is heated to 55° C. and thereafter 615 grams of strontium oxide (11.95 equivalents) is added over a 10 minute period while maintaining the reaction at a temperature of 55°–65° C. The mixture is heated an additional hour at this same temperature range and thereafter blown with carbon dioxide at a rate of 4 cubic feet per hour for about 3 hours until the reaction mixture was slightly acidic to phenolphthalein. Thereafter the reaction mixture is heated to 160° C. and held there for about 1 hour while blowing the nitrogen at 5 cubic feet per hour. Thereafter, the product is filtered, the filtrate being the desired overbased material having a metal ratio of 3.8.

(b) To a mixture of 3800 parts (4 equivalents) of a 50% mineral oil solution of lithium petroleum sulfonate (sulfate ash of 6.27%), 460 parts (2.4 equivalents) of heptylphenol, 1,920 parts of mineral oil, and 300 parts of water, there is added at 70° C. 1,216 parts (28.9 equivalents) of lithium hydroxide monohydrate over a period of 0.25 hours. This mixture is stirred at 110° C. for 1 hour, heated to 150° C. over a 2.5 hour period, and blown with carbon dioxide at the rate of 4 cubic feet per hour over a period of about 3.5 hours until the reaction mixture is substantially neutral. The mixture is filtered and the filtrate is the desired product having a sulfate ash content of 25.23% and a metal ratio of 7.2.

Example 39

A mixture of alkylated benzene sulfonic acids and naphtha is prepared by adding 1000 grams of a mineral oil solution of the acid containing 18% by weight mineral oil (1.44 equivalents of acid) and 222 grams of naphtha. While stirring the mixture, 3 grams of calcium chloride dissolved in 90 grams of water and 53 grams of Mississippi lime (calcium hydroxide) is added. This mixture is heated to 97–99° C. and held at this temperature for 0.5 hour. Then 80 grams of Mississippi lime are added to the reaction mixture with stirring and nitrogen gas is bubbled therethrough to remove water, while heating to 150° C. over a three-hour period. The reaction mixture is then cooled to 50° C. and 170 grams of methanol are added. The resulting mixture is blown with carbon dioxide at the rate of 2 cubic feet per hour until substantially neutral. The carbon dioxide blowing is discontinued and the water and methanol stripped from the reaction mixture by heating and bubbling nitrogen gas therethrough. While heating to remove the water and methanol, the temperature rose to 146° C. over a 1.75 hour period. At this point the metal ratio of the overbased material was 2.5 and the product is a clear, dark brown viscous liquid. This material is permitted to cool to 50° C. and thereafter 1256 grams thereof is mixed with 574 grams of naphtha, 222 grams of methanol, 496 grams of Mississippi lime, and 111 grams of an equal molar mixture of isobutanol and amyl alcohol. The mixture is thoroughly stirred and carbon dioxide is blown therethrough at the rate of 2 cubic feet per hour for 0.5 hour. An additional 124 grams of Mississippi lime is added to the mixture with stirring and the $CO_2$ blowing continued. Two additional 124 gram increments of Mississippi lime are added to the reaction mixture while continuing the carbonation. Upon the addition of the last increment, carbon dioxide is bubbled through the mixture for an additional hour. Thereafter, the reaction mixture is gradually heated to about 146° C. over a 3.25 hour period while blowing with nitrogen to remove water and methanol from the mixture.

Thereafter, the mixture is permitted to cool to room temperature and filtered producing 1,895 grams of the desired overbased material having a metal ratio of 11.3. The material contains 6.8% mineral oil, 4.18% of the isobutanol-amyl alcohol and 30.1% naphtha.

Example 40

A mixture of 406 grams of naphtha and 214 grams of amyl alcohol is placed in a three-liter flask equipped with reflux condenser, gas inlet tubes, and stirrer. The mixture is stirred rapidly while heating to 38° C. and adding 27 grams of barium oxide. Then 27 grams of water are added slowly and the temperature rises to 45° C. Stirring is maintained while slowly adding over 0.25 hours 73 grams of oleic acid. The mixture is heated to 95° C. with continued mixing. Heating is discontinued and 523 grams of barium oxide are slowly added to the mixture. The temperature rises to about 115° C. and the mixture is permitted to cool to 90° C. whereupon 67 grams of water are slowly added to the mixture and the temperature rises to 107° C. The mixture is then heated within the range of 107–120° C. to remove water over a 3.3 hour period while bubbling nitrogen through the mass. Subsequently, 427 grams of oleic acid is added over a 1.3 hour period while maintaining a temperature of 120°–125° C. Thereafter heating is terminated and 236 grams of naphtha is added. Carbonation is commenced by bubbling carbon dioxide through the mass at two cubic feet per hour for 1.5 hours during which the temperature is held at 108°–117° C. The mixture is heated under a nitrogen purge to remove water. The reaction mixture is filtered twice producing a filtrate, analyzing as follows: sulfate ash content, 34.42%; metal ratio, 3.3. The filtrate contains 10.7% amyl alcohol and 32% naphtha.

Example 41

A reaction mixture comprising 1800 grams of a calcium overbased petrosulfonic acid containing 21.7% by weight mineral oil, 36.14% by weight naphtha, 426 grams naphtha, 255 grams of methanol, and 127 grams of an equal molar amount of isobutanol and amyl alcohol are heated to 45° C. under reflux conditions and 148 grams of Mississippi lime (commercial calcium hydroxide) is added thereto. The reaction mass is then blown with carbon dioxide at the rate of 2 cubic feet per hour and thereafter 148 grams of additional Mississippi lime added. Carbonation is continued for another hour at the same rate. Two additional 147 gram increments of Mississippi lime are added to the reaction mixture, each increment followed by about a 1 hour carbonation process. Thereafter, the reaction mass is heated to a temperature of 138° C. while bubbling nitrogen therethrough to remove water and methanol. After filtration, 2,220 grams of a solution of the barium overbased petrosulfonic acid is obtained having a metal ratio of 12.2 and containing 12.5% by weight mineral oil, 34.15% by weight naphtha, and 4.03% by weight of the isobutanol amyl alcohol mixture.

Example 42

(a) Following the procedure of Example 2 above, the corresponding lead product is prepared by replacing the barium petrosulfonate with lead petroleum sulfonate (1 equivalent) and barium oxide with lead oxide (25 equivalents).

(b) Following the procedure of Example 5(a) above, the corresponding overbased sodium suulfonate is prepared by replacing the barium oxide with sodium hydroxide.

The above examples illustrate various means for preparing overbased materials suitable for conversion to the non-Newtonian colloidal disperse systems utilized in the present invention. Obviously, it is within the skill of the art to vary these examples to produce any desired overbased material. Thus, other acidic materials such as mentioned hereinbefore can be substituted for the $CO_2$, $SO_2$, and acetic acid used in the above examples. Similarly, other metal bases can be employed in lieu of the metal base used in any given example. Or mixtures of bases and/or mixtures of materials which can be overbased can be utilized. Similarly, the amount of mineral oil or other non-polar, inert, organic liquid used as the overbasing medium can be varied widely both during overbasing and in the overbased product.

The following examples illustrate the conversion of the Newtonian overbased materials into non-Newtonian colloidal disperse systems by homogenization with conversion agents.

Example I

To 733 grams of the overbased material of Example 5(a) there is added 179 grams of acetic acid and 275 grams of a mineral oil (having a viscosity of 2000 SUS at 100° F.) at 90° C. in 1.5 hours with vigorous agitation. The mixture is then homogenized at 150° C. for 2 hours and the resulting material is the desired colloidal disperse system.

Example II

A mixture of 960 grams of the overbased material of Example 5(b), 256 grams of acetic acid, and 300 grams of a mineral oil (having a viscosity of 2000 SUS at 100° F.) is homogenized by vigorous stirring at 150° C. for 2 hours. The resulting product is a non-Newtonian colloidal disperse system of the type contemplated for use by the present invention.

The overbased materials of Examples I and II can be converted without the addition of additional mineral oil or if another inert organic liquid is substituted for the mineral oil.

Example III

A mixture of 150 parts of the overbased material of Example 6, 15 parts of methyl alcohol, 10.5 parts of amyl alcohol, and 45 parts of water is heated under reflux conditions at 71°–74° C. for 13 hours whereupon the mixture gels. The gel is heated for 6 hours at 144° C., diluted with 126 parts of the mineral oil of the type used in Example I above the diluted mixture heated to 144° C. for an additional 4.5 hours. The resulting thickened product is a colloidal disperse system. Again, it is not necessary that the material be diluted with mineral oil in order to be useful. The gel itself which results from the initial homogenization of the overbased material and the lower alkanol mixture is a particularly useful colloidal disperse system for incorporating into resinous compositions.

Example IV

A mixture of 1000 grams of the product of Example 12, 80 grams of methanol, 40 grams of mixed primary amyl alcohols (containing about 65% by weight of normal amyl alcohol, 3% by weight of isoamyl alcohol, and 32% of 2-methyl-1-butyl alcohol) and 80 grams of water are introduced into a reaction vessel and heated to 70° C. and maintained at that temperature for 4.2 hours. The overbased material is converted to a gelatinous mass, the latter is stirred and heated at 150° C. for a period of about 2 hours to remove substantially all the alcohols and water. The residue is a dark green, gel which is a particularly useful colloidal disperse system.

Example V

The procedure of Example IV is repeated except that 120 grams of water is used to replace the water-alkanol mixture employed as the conversion agent therein. Conversion of the Newtonian overbased material into the non-Newtonian colloidal disperse system requires about 5 hours of homogenization. The disperse system is in the form of a gel.

Example VI

To 600 parts by weight of the overbased material of Example 6, there is added 300 parts of dioctylphthalate, 48 parts of methanol, 36 parts of isopropyl alcohol, and 36 parts of water. The mixture is heated to 70°–77° C. and maintained at this temperature for 4 hours during which the mixture becomes more viscous. The viscous solution is then blown with carbon dioxide for 1 hour until substantially neutral to phenolphthalein. The alcohols and water are removed by heating to approximately 150° C. The residue is the desired colloidal disperse system.

Example VII

To 800 parts of the overbased material of Example 6, there is added 300 parts of kerosene, 120 parts of an alcohol:water mixture comprising 64 parts of methanol, 32 parts of water and 32 parts of the primary amyl alcohol mixture of Example IV. The mixture is heated to 75° C. and maintained at this temperature for 2 hours during which time the viscosity of the mixture increases. The water and alcohols are removed by heating the mixture to about 150° C. while blowing with nitrogen for 1 hour. The residue is the desired colloidal disperse system having the consistency of a gel.

Example VIII

A mixture of 340 parts of the product of Example 6, 68 parts of an alcohol:water solution consisting of 27.2 parts of methanol, 20.4 parts of isopropyl alcohol and 20.4 parts of water, and 170 parts of heptane is heated to 65° C. During this period, the viscosity of the mixture increases from an initial value of 6,250 to 54,000.

The thickened colloidal disperse system is further neutralized by blowing the carbon dioxide at the rate of 5 lbs. per hour for 1 hour. The resulting mass is found to have a neutralization number of 0.87 (acid to phenolphthalein indicator).

Example IX

The procedure of Example VIII is repeated except that the calcium overbased material of Example 6 is replaced by an equivalent amount of the cadmium and barium overbased material of Example 17. Xylene (200 parts) is used in lieu of the heptane and the further carbonation step is omitted.

Example X

A mixture of 500 parts of the overbased material of Example 6, 312 parts of kerosene, 40 parts of methylethyl ketone, 20 parts of isopropyl alcohol, and 50 parts of water is prepared and heated to 75° C. The mixture is maintained at a temperature of 70–75° C. for 5 hours and then heated to 150° C. to remove the volatile components. The mixture is thereafter blown with ammonia for 30 minutes to remove most of the final traces of volatile materials and thereafter permitted to cool to room temperature. The residue is a brownish-tan colloidal disperse system in the form of a gel.

Example XI

A mixture of 500 parts of the product of Example 6, 312 parts of kerosene, 40 parts of acetone, and 60 parts of water is heated to reflux and maintained at this temperature for 5 hours with stirring. The temperature of the material is then raised to about 155° C. while removing the volatile components. The residue is a viscous gel-like material which is the desired colloidal disperse system.

Example XII

The procedure of Example XI is repeated with the substitution of 312 parts of heptane for the kerosene and 60 parts of water for the acetone-water mixture therein. At the completion of the homogenization, hydrogen gas is bubbled through the gel to facilitate the removal of water and any other volatile components.

Example XIII

To 500 parts of the overbased material of Example 9, there is added 312 parts of kerosene, 40 parts of o-cresol, and 50 parts of water. This mixture is heated to the reflux temperature (70–75° C.) and maintained at this temperature for 5 hours. The volatile components are then removed from the mixture by heating to 150° C. over a period of 2 hours. The residue is the desired colloidal disperse system containing about 16% by weight of kerosene.

Example XIV

A mixture of 500 parts of the overbased material of Example 5(a) and 312 parts of heptane is heated to 80° C. whereupon 149 parts of glacial acetic acid (99.8% by weight) is aded dropwise over a period of 5 hours. The mixture is then heated to 150° C. to remove the volatile components. The resulting gel-like material is the desired colloidal disperse system.

Example XV

The procedure of Example XIV is repeated except that 232 parts of boric acid is used in lieu of the acetic acid. The desired gel is produced.

Example XVI

The procedure of Example XII is repeated except that the water is replaced by 40 parts of methanol and 40 parts of diethylene triamine. Upon completion of the homogenization, a gel-like colloidal disperse system is produced.

Example XVII

A mixture of 500 parts of the product of Example 6 and 300 parts of heptane is heated to 80° C. and 68 parts of anthranilic acid is added over a period of 1 hour while maintaining the reaction temperature between 80° and 95° C. The reaction mixture is then heated to 150° C. over a 2 hour period and blown with nitrogen for 15 minutes to remove the volatile components. The resulting collodial disperse system is a moderately stiff gel.

Example XVIII

The procedure of Example XVII is repeated except that the anthranilic acid is replaced by 87 parts of adipic acid. The resulting product is very viscous and is the desired colloidal disperse system. This gel can be diluted, if desired, with mineral oil or any of the other materials said to be suitable for disperse mediums hereinabove.

Example XIX

A mixture of 500 parts of the product of Example 8 and 300 parts of heptane is heated to 80° C. whereupon 148 parts of glacial acetic acid is added over a period of 1 hour while maintaining the temperature within the range of about 80°–88° C. The mixture is then heated to 150° C. to remove the volatile components. The residue is a viscous gel which is useful for incorporation into the polymeric resins of the present invention. It may also be diluted with a material suitable as a disperse medium to facilitate incorporation into resinous compositions.

Example XX

A mixture of 300 parts of toluene and 500 parts of an overbased material prepared according to the procedure of Example 7 and having a sulfate ash content of 41.8% is heated to 80° C. whereupon 124 parts of glacial acetic acid is added over a period of 1 hour. The mixture is then heated to 175° C. to remove the volatile components. During this heating, the reaction mixture becomes very viscous and 380 parts of mineral oil is added to facilitate the removal of the volatile components. The resulting colloidal disperse system is a very viscous grease-like material.

Example XXI

A mixture of 700 parts of the overbased material of Example 5(b), 70 parts of water, and 350 parts of toluene is heated to reflux and blown with carbon dioxide at the rate of 1 cubic foot per hour for 1 hour. The reaction product is a soft gel.

Example XXII

The procedure of Example XVIII is repeated except that the adipic acid is replaced by 450 grams of di(4-methylamyl)phosphorodithioic acid. The resulting material is a gel.

Example XXIII

The procedure of Example XVI is repeated except that the methanol-amine mixture is replaced by 250 parts of a phosphorus acid obtained by treating with steam at 150° C. the product obtained by reacting 1000 parts of polyisobutene having a molecular weight of about 60,000, with 24 parts of phosphorus pentasulfide. The product is a viscous brown gel-like colloidal disperse system.

Example XXIV

The procedure of Example XX is repeated except that the overbased material therein is replaced by an equivalent amount of the potassium overbased material of Example 18 and the heptane is replaced by an equivalent amount of toluene.

Example XXV

The overbased material of Example 6 is isolated as a dry powder by precipitation out of a benzene solution through the addition thereto of acetone. The precipitate is washed with acetone and dried.

A mixture of 45 parts of a toluene solution of the above powder (364 parts of toluene added to 500 parts of the powder to produce a solution having a sulfate ash content of 43%), 36 parts of methanol, 27 parts of water, and 18 parts of mixed isomeric primary amyl alcohols (described in Example IV) is heated to a temperature within the range of 70-75° C. The mixture is maintained at this temperature for 2.5 hours and then heated to remove the alkanols. The resulting material is a colloidal disperse system substantially free from any mineral oil. If desired, the toluene present in the colloidal disperse system as the disperse medium can be removed by first diluting the disperse system with mineral oil and thereafter heating the diluted mixture to a temperature of about 160° C. whereupon the toluene is vaporized.

Example XXVI

Calcium overbased material similar to that prepared in Example 6 is made by substituting xylene for the mineral oil used therein. The resulting overbased material has a xylene content of about 25% and a sulfate ash content of 39.3%. This overbased material is converted to a colloidal disperse system by homogenizing 100 parts of the overbased material with 8 parts of methanol, 4 parts of the amyl alcohol mixture of Example IV, and 6 parts of water. The reaction mass is mixed for 6 hours while maintaining the temperature at 75°-78° C. Thereafter, the disperse system is heated to remove the alkanols and water. If desired, the gel can be diluted by the addition of mineral oil, toluene, xylene, or any other suitable disperse medium.

Example XXVII

Air at the rate of 5 cubic feet per hour is blown through an overbased material of the type prepared according to Example 6 having a calcium sulfonate ash content of 44.1% while rapidly stirring it at 205° C. for 24 hours. The product, on cooling is a gel having a calcium sulfate ash content of 48.14% and a reflux base number of 368.

Example XXVIII

A colloidal disperse system of the type prepared in Example XXVII is obtained following the same technique and blowing with air for 28 hours at a temperature of 190° C.

Example XXIX

A solution of 1,000 grams of the gel-like colloidal disperse system of Example III is dissolved in 1,000 grams of toluene by continuous agitation of these two components for about 3 hours. A mixture of 1000 grams of the resulting solution, 20 grams of water, and 20 grams of methanol are added to a three-liter flask. Thereafter, 92.5 grams of calcium hydroxide is slowly added to the flask with stirring. An exothermic reaction takes place raising the temperature to 32° C. The entire reaction mass is then heated to about 60° C. over a 0.25 hour period. The heated mass is then blown with carbon dioxide at the rate of 3 standard cubic feet per hour for 1 hour while maintaining the temperature at 60°-70° C. At the conclusion of the carbonation, the mass is heated to about 150° C. over a 0.75 hour period to remove water, methanol, and toluene. The resulting product is a clear, light brown colloidal disperse system in the form of a gel. In this manner additional metal containing particles are incorporated into the colloidal disperse system.

At the conclusion of the carbonation step and prior to removing the water, methanol, and toluene, more calcium hydroxide could have been added to the mixture and the carbonation step repeated in order to add still additional metal-containing particles to the colloidal disperse system.

Example XXX

A mixture of 1200 grams of the gel produced according to Example III, 600 grams of toluene, and 48 grams of water is blown with carbon dioxide at 2 standard cubic feet per hour while maintaining the temperature at 55-65° C. for 1 hour. The carbonated reaction mass is then heated at 150° C. for 1.75 hours to remove the water and toluene. This procedure improves the texture of the colloidal disperse systems and converts any calcium oxide or calcium hydroxide present in the gel produced according to Example III into calcium carbonate particles.

Example XXXI

A mixture comprising 300 grams of water, 70 grams of the amyl alcohol mixture identified in Example IV above, 100 grams of methanol, and 1000 grams of a barium overbased oleic acid, prepared according to the general technique of Example 3 by substituting oleic acid for the petrosulfonic acid used therein, and having a metal ratio of about 3.5 is thoroughly mixed for about 2.5 hours while maintaining the temperature within the range of from about 72-74° C. At this point the resulting colloidal disperse system was in the form of a very soft gel. This material was then heated to about 150° C. for a 2 hour period to expel methanol, the amyl alcohols, and water. Upon removal of these liquids, the colloidal disperse system was a moderately stiff, gel-like material.

Example XXXII

A dark brown colloidal disperse system in the form of a very stiff gel was prepared from the product of Example 40 using a mixture of 64 grams of methanol and 80 grams of water as the conversion agent to convert 800 grams of the overbased material. After the conversion process, the resulting disperse system is heated to about 150° C. to remove the alcohol and water.

Example XXXIII 1000 grams of the overbased material of Example 39 is converted to a colloidal disperse system by using as a conversion agent a mixture of 100 grams of methanol and 300 grams of water. The mixture is stirred for 7 hours at a temperature within the range of 72-80° C. At the conclusion of the mixing, the resulting mass is heated gradually to a temperature of about 150° C. over a 3 hour period to remove all volatile liquid contained therein. Upon removal of all volatile solvents, a tan powder was obtained. By thoroughly mixing this tan powder to a suitable organic liquid such as naphtha, it is again transformed into a colloidal disperse system.

Example XXXIV

A mixture of 1000 grams of the product of Example 41, 100 grams of water, 80 grams of methanol, and 300 grams of naphtha were mixed and heated to 72° C. under reflux conditions for about 5 hours. A light brown viscous liquid material is formed which is the desired colloidal disperse system. This liquid is removed and consists of the colloidal disperse system wherein about 11.8% of the disperse medium is mineral oil and 88% is naptha.

Following the techniques of Example III additional overbased materials as indicated below are converted to the corresponding colloidal disperse systems.

| Example No.: | Overbased material converted to colloidal disperse system (Example) |
|---|---|
| XXXV | 15 |
| XXXVI | 21 |
| XXXVII | 23 |
| XXXVIII | 24(a) |
| XXXIX | 28 |
| XL | 31 |
| XLI | 39 |
| XLII | 40 |

The preparation of other non-Newtonian colloidal disperse systems useful in the compositions of this invention are disclosed in copending application Ser. No. 535,048, now abandoned, filed Mar. 17, 1966, and Ser. No. 535,693 filed Mar. 21, 1966.

The change in rheological properties associated with conversion of a Newtonian overbased material into a non-Newtonian colloidal disperse system is demonstrated by the Brookfield Viscometer data derived from overbased materials and colloidal disperse systems prepared therefrom. In the following samples, the overbased material and the colloidal disperse systems are prepared according to the above-discussed and exemplified techniques. In each case, after preparation of the overbased material and the colloidal disperse system, each is blended with dioctylphthalate (DOP) so that the compositions tested in the viscometer contains 33.3% by weight DOP (Samples A, B, and C) or 50% by weight DOP (Sample D). In Samples A–C, the acidic material used in preparing the overbased material is carbon dioxide while in Sample D, acetic acid is used. The samples each are identified by two numbers (1) and (2). The first is the overbased material-DOP composition and the second the colloidal disperse system-DOP composition. The overbased materials of the samples are further characterized as follows:

Sample A.—Calcium overbased petrosulfonic acid having a metal ratio of about 12.2.

Sample B.—Barium overbased oleic acid having a metal ratio of about 3.5.

Sample C.—Barium overbased petrosulfonic acid having a metal ratio of about 2.5.

Sample D.—Calcium overbased commercial higher fatty acid mixture having a metal ratio of about 5.

The Brookfield Viscometer data for these compositions is tabulated below. The data of all samples is collected at 25° C.

TABLE—BROOKFIELD VISCOMETER DATA
[Centipoises]

| | Sample A | | Sample B | | Sample C | | Sample D | |
|---|---|---|---|---|---|---|---|---|
| | (1) | (2) | (1) | (2) | (1) | (2) | (1) | (2) |
| R.p.m.: | | | | | | | | |
| 6 | 230 | 2,620 | 80 | 15,240 | 240 | 11,320 | 114 | 8,820 |
| 12 | 235 | 2,053 | 90 | 8,530 | 230 | 6,980 | 103 | 5,220 |
| 30 | 239 | (¹) | 88 | (¹) | 224 | 4,008 | 100 | 2,892 |

¹ Off scale.

The following examples are illustrative of the polymeric compositions of the present invention containing the colloidal disperse systems. A variety of resinous materials are utilized in the examples. In some instances, Brookfield Viscometer data is given on the resulting compositions to demonstrate the non-Newtonian characteristics of the polymeric compositions containing the non-Newtonian colloidal disperse systems. The use of Brookfield Viscosities for determining the non-Newtonian characteristics of a given plastic composition is the subject of an article "A Method for the Interpretation of Brookfield Viscosities" by R. L. Bowles et al., and published in "Modern Plastics," volume 33, No. 3, pages 140–148 (1955).

The following polymeric compositions are prepared by blending the indicated components in a Hobart mixer.

| Example No. | Components of the Composition (parts by weight) | | |
|---|---|---|---|
| | PVC [1] | DOP [2] | Disperse System |
| A | 100 | 80 | 5 parts—Ex. III. |
| B | 100 | 80 | 10 parts—Ex. III. |
| C | 100 | 80 | 5 parts—Ex. XXXI. |
| D | 100 | 80 | 5 parts—Barium-containing disperse system.[3] |

[1] Commercially available pelletized polyvinyl chloride resin from B. F. Goodrich Chemical Co. as Geon 121.
[2] Dioctyl phthalate—plasticizer.
[3] Disperse system prepared from a barium overbased petroleum sulfonic acid (metal ratio—2.5).

BROOKFIELD VISCOMETER DATA
[Centipoises]

| | A | B | C | D |
|---|---|---|---|---|
| R.p.m.: | | | | |
| 2 | 44,000 | 121,500 | 14,000 | 26,000 |
| 4 | 28,250 | 72,750 | 10,000 | 16,000 |
| 10 | 17,000 | 39,400 | 6,600 | 10,250 |
| 20 | 12,300 | 26,300 | 5,200 | 7,600 |

This data vividly demonstrates the marked apparent viscosity differences associated with an increase in the rate of shear (r.p.m.).

The following epoxy resin compositions are prepared by blending the indicated materials:

| Example No. | Components of the Composition (parts by weight) | | |
|---|---|---|---|
| | Epoxy Resin [1] | DOP | Disperse System [2] |
| E | 194 | 194 | 12 |
| F | 190 | 190 | 20 |
| G | 186 | 186 | 28 |
| H | 180 | 180 | 40 |

[1] Commercially available epoxy resin from Shell Chemical Co. as Epon 828.
[2] The disperse system of Example XXXIII.

BROOKFIELD VISCOMETER DATA
[Centipoises]

| | E | F | G | H |
|---|---|---|---|---|
| R.p.m. | | | | |
| 2 | 2,900 | 6,050 | 9,000 | 21,900 |
| 4 | 2,100 | 4,050 | 5,800 | 13,500 |
| 10 | 1,500 | 2,610 | 3,640 | 7,220 |
| 20 | 1,250 | 1,980 | 2,800 | 4,960 |

Example I

Cold-dip polyvinyl chloride plastisols having the following compositions are prepared by blending the appropriate materials in the indicated parts-by-weight proportions.

| | (a) | (b) | (c) |
|---|---|---|---|
| Pelletized PVC | 400 | 400 | 400 |
| Plasticizer | 286 | 316 | 316 |
| Stoddard Solvent | 80 | 54 | 54 |
| Stabilizers, etc | 24 | 24 | 24 |
| Disperse Medium | 90 [1] | 86 [2] | 86 [3] |

[1] Composition consisting of product of type according to Example III and 33% by weight DOP.
[2] Composition consisting of product of type according to Example III and 30% by weight xylene.
[3] Composition consisting of product of type according to Example III and 30% by weight Stoddard Solven .

BROOKFIELD VISCOMETER DATA
[Centipoises]

| | (a) | (b) | (c) |
|---|---|---|---|
| R.p.m. | | | |
| 2 | 51,000 | 53,000 | 56,000 |
| 4 | 29,000 | 29,000 | 31,000 |
| 10 | 14,400 | 14,800 | 15,600 |
| 20 | 9,800 | 10,000 | 10,000 |

Example J

A mixture of 3,410 grams of petrosulfonic acid (5 equivalents) and 2048 grams of naphtha are added to a 12 liter flask fitted with stirrer, reflux condenser, gas inlet tube, and thermometer. This mixture is heated to 95° under reflux conditions and a solution of 283 grams of calcium chloride in 283 grams of water is added slowly to the reaction mass over approximately a 1 hour period. The mixing was continued for another 0.5 hour and thereafter 278 grams (7.5 equivalents) of calcium hydroxide was added slowly to the mass and stirring was maintained for an additional 0.5 hour. The mass was then heated to remove water while bubbling nitrogen gas therethrough to facilitate the water removal. After the water removal step, the mass is cooled to 60° C. and 580 grams of methanol are added which resulted in a further drop of the temperature to 50° C. Thereafter, the reaction mass is maintained at a temperature of 45–60° C. while blowing carbon dioxide therethrough at 4 cubic feet per hour for 1 hour. Carbonation is terminated and the temperature is elevated to about 150° C. with a nitrogen purge to remove water and methanol. After filtering, 4,795 grams of material was recovered in the form of a clear dark brown liquid having a metal ratio of 2.5 and containing 21.07% mineral oil (from the petrosulfonic acid starting material) and 36.14% naphtha.

Thirty-six hundred grams of the material produced above, 1,706 grams naphtha, and 510 grams of methanol are added to a 12 liter flask equipped as before. The mixture is heated to about 45° C. and 295 grams of calcium hydroxide are added thereto. While maintaining the temperatutre within the range of 45–50° C. carbon dioxide is blown through the mass at the rate of 3.5 cubic feet per hour for 0.5 hour. An additional 295 grams of calcium hydroxide is added and the carbonation continued for a nadditional hour. Again, 295 grams of calcium hydroxide are added and carbonation is continued for another hour with still another 295 gram portions of calcium hydroxide then being added followed by an additional 2.75 hours of carbonation. A nitrogen purge and heating to about 150° C. removes the methanol and water from the product. A commercial filter aid material is added to the mass and the whole was filtered yielding 5,347 grams filtrate. This filtrate consists of a clear dark brown liquid and is a calcium overbased petrosulfonic acid material having a metal ratio of 11.95 and an oil content of 11% and a naphtha content of 45%, and a barium sulfate ash content of 37.43%.

A mixture comprising 500 grams of the overbased material produced above, 500 grams of naphtha, 50 grams of water, and 40 grams of methanol are added to a 3 liter flask equipped with a reflux condenser and stirrer. This mixture is heated to 73° C. over a 1 hour period and maintained at 72–74° C. for an additional two hours with continued mixing. The resulting mixture is then transferred to a Hobart mixer and 420 grams of dioctylphthalate are added thereto. Thorough mixing is conducted over a 2 hour period while raising the temperature to about 155° C. to remove the methanol, water, and naphtha. The resulting colloidal disperse system consists of a soft gel-like material having a sulfate ash content of 27.06%, dioctylphthalate content of 60.3%, and and oil content of 7.9%.

The colloidal disperse system thus produced is incorporated into a mixture of commercially available epoxy resins (270 grams of Epon 828), 240 grams of dioctylphthalate, and 60 grams of the disperse system. Because of the high dilution of this particular colloidal disperse system, i.e., about 70% of the disperse system is dioctylphthalate and mineral oil, the amount of metal-containing particles therein is greatly reduced. In fact, the calcium content of the overall disperse system is less than 8%. Accordingly, the Brookfield Viscosity data indicates decreased effectiveness in altering the viscosity of the resinous material. However, if the dioctylphthalate content of the disperse system is reduced by 40 to 60%, a much more effective modification of the viscosity is achieved.

Example K

A resinous composition is prepared by blending 180 parts of the commercial epoxy resin of Example J, 180 parts of dioctylphthalate, and 40 parts of the colloidal disperse system of the type prepared in Example III except that an equivalent amount of acetic acid is used as the conversion agent in lieu of the alkanol-water mixture. Brookfield Viscometer data shows centipoise values of 4,400; 3,100; 1,970; and 1,500 for r.p.m. values of 2, 4, 10, and 20. A control batch of 120 parts each of the epoxy resin and dioctylphthalate exhibit cps. values of 700, 675, 630, and 620 at the same r.p.m. values under identical conditions.

Example L

A substantially oil-free disperse system is prepared by converting an overbased calcium petrosulfonic acid material (which was formed in a naphtha solution of the acid as shown in Example J) with an alkanol-water mixture as a conversion agent. The alkanol-water mixture consisted of 80 parts water, 60 parts methanol, and 60 parts isopropanol. Conversion is conducted in the presence of 570 parts of diisodecylphthalate. Upon completion of the conversion, the volatile materials are removed from the resulting mass by heating for a period of 2 hours at about 120° C. The resulting disperse system comprises about equal weights of diisodecylphthalate and the converted overbased petrosulfonic acid material in the form of a light-brown stiff gel having a calcium sulfate ash content of about 36%. This gel-like material is then mixed with dioctylphthalate in a weight ratio of gel to dioctylphthalate of 100:50.

The mixture is incorporated into the commercially available liquid polysulfide material used as a sealant in an amount of polysulfide resin to the mixture of 120:18. Brookfield Viscometer tests show cps. values of 64,000; 56,000; 49,600; and 43,200 at 2, 4, 10, and 20 r.p.m.

Example M

Barium-overbased oleic acid (metal ratio of about 3.5) is dissolved in naphtha to form 1,000 parts of a solution containing about 57.6% of the naphtha. This solution and 100 parts of isopropanol are mixed and thereafter a solution of 100 parts of water containing 2.85 parts of a 50% caustic solution is added thereto. The material is thoroughly mixed over a period of about 4 hours under reflux conditions at a temperature of 72–77° C. A light yellow disperse material results and has the consistency of a gel. Subsequently, 576 parts of dioctylphthalate is added to the disperse system with mixing while maintaining the temperature at about 55–60° C. The temperature is then raised to about 150° C. for about 2 hours to remove the naphtha, water, and alcohols.

The resulting mixture is incorporated in the same liquid polysulfide material of Example M in the same weight ratio. Brookfield Viscometer tests show cps. values of 128,000; 100,000; 72,000; and 59,200.

Example N

A disperse system of the type produced in Example III is mixed with xylene so that the resulting mixture contains about 30% by weight xylene. This mixture is added to the polysulfide material of Example M in the same weight ratio. Centipoise values of the resulting polymeric compositions are 32,000; 28,000; 27,200; and 26,400.

Example O

A polymeric structural caulk comprising as the major resinous component about 50% by weight of a liquid polysulfide resin (LP–12 sold by Thiokol Chemical Company) exhibits centipoise values of 440,000; 296,000; 194,000;

and 155,000 in Brokfield Viscometer tests at 2, 4, 10, and 20 r.p.m. A colloidal disperse system of the type described in Example 3 is blended with another portion of the identical caulk in an amount equal to 10% by weight based on the weight of the polysulfide polymer. At the r.p.m. values given above, the resulting caulk displays cps. values of 1,100,000; 700,000; 400,000; and 200,000.

Example P

A white architectural caulk containing as the only major polymeric resin about 25% by weight of a commercially available polymercaptan resin is blended with a disperse system of the type according to Example 3 in an amount of 5% and 10% by weight based on the weight of the polymercaptan.

Example Q

A butyl rubber caulk containing about 36% by weight butyl rubber as the only major polymeric resinous component is blended with 10% by weight of the disperse system of Example III based on the weight of the butyl rubber.

Example R

A disperse system is incorporated into a rigid polyvinyl chloride resin according to the following technique. The commercially available rigid polyvinyl chloride (Geon 103 EP) in an amount of 400 parts is added to a high speed blender operated at 5000 r.p.m. until the temperature rises to about 98° C. A previously mixed composition comprising 20 parts of disperse system of Example III, 2 parts of calcium stearate, 4 parts paraffin wax, and 16 parts of a stabilizer for the polyvinyl chloride resin is added to the polyvinyl chloride and the high-speed mixing is continued while raising the temperature of the mixture to about 120° C. The resulting polymeric composition is particularly adapted to extrusion processes.

Following the technique, the same type of disperse system is incorporated into similar rigid polyvinyl chloride formulations in an amount of 5, 7.5, and 10 parts by weight based on the weight of the polyvinyl chloride present therein. The remainder of the composition is as follows: polyvinyl chloride—100 parts; stabilizers—2 parts: titanium dioxide—5 parts; and carbon black—2 parts.

Another polyvinyl chloride formulation is prepared comprising 100 parts polyvinyl chloride, 2 parts of the same stabilizer, 5 parts of a commercial polyvinyl chloride processing aid, 2 parts calcium stearate, 0.7 part paraffin wax, 5 parts titanium dioxide, and 0.2 part of carbon black.

The latter composition and the composition containing 5 parts of the disperse system, 2 parts of stabilizer, 5 parts of titanium dioxide, 2 parts carbon black, and 100 parts polyvinyl chloride are both used to extrude tubing. To extrude 15 lbs. of the polyvinyl chloride formulations of the prior art in one hour requires an extruder screw-speed of about 95 r.p.m. while the same amount of the formulation containing the colloidal disperse system requires a screw-speed of only 68 r.p.m. Or, from another point of view, a screw-speed of 70 r.p.m. extrudes about 11.5 lbs. of prior art material per hour and about 15.5 lbs. of the polyvinyl chloride formulation of the present invention. Moreover, the formulation of the present invention requires a total of 5 parts by weight of the colloidal disperse system to replace 7.7 parts by weight of the processing aids, lubricants, etc. of the prior art. In other words, the amount of additive used in the prior art is reduced by about 35% on a weight basis without any loss in the quality of product and a substantial gain in extrusion rate.

Example S

A resinous composition is prepared by mixing 100 parts of pelletized polyvinyl chloride, 100 parts of dioctylphthalate, and 7.5 parts of the disperse system of Example IX.

Example T

A composition similar to that of Example S is prepared by replacing the disperse system therein with the same weight of the disperse system of Example XXV.

Example U

By replacing the disperse system of Example S with the same weight of the disperse system of Example XXX, another resinous composition illustrative of the present invention is prepared.

Additional illustrative examples of the resinous compositions of the invention are formed by incorporating 6 parts by weight (based on the weight of polymeric resins) of the product of Example III into the following conventional resin-plasticizer composition, the plasticizer being present in an amount equal to that of the resin.

| Example | Polymeric Resin | Plasticizer |
|---|---|---|
| V | Polyvinyl acetate | Dicyclohexylphthalate. |
| W | Cellulose nitrate | Di-(2-ethylhexyl) phthalate. |
| X | Cellulose acetate | Diethylphthalate. |
| Y | Polyethylene | Dicyclohexylphthalate. |

Additional conventional additives can also be present in these compositions such as fillers, stabilizers, pigments, etc.

Example Z

A polymeric composition is prepared following the technique of Example U but substituting an equivalent amount of the disperse system of Example XXXIX for that of Example IX.

Example AA

A barium-overhead oleic acid prepared in naphtha and free from mineral oil is converted to a disperse system using an isopropanol-water mixture (200 parts isopropanol=600 parts water) as the conversion agent. Thereafter, the disperse system is mixed with dioctylphthalate and heated to about 130° C. to expel water, isopropanol, and naphtha. The resulting mixture consists of 25 parts by weight dioctylphthalate and has a barium sulfate ash content of about 45%. Additional dioctylphthalate is added to give a total dioctylphthalate content of about 70 parts.

(A) A polymeric composition containing 77 parts of a mercaptan-terminated polybutadiene-acrylonitrile copolymer, 19 parts of an epoxy resin (Epon 828), and 4.8 parts of the dioctylphthalate-containing colloidal disperse system prepared above is prepared by blending these components. The resulting composition exhibits centipoise values of 114,000; 102,000; 84,400; and 74,800 as determined from the Brookfield Viscometer at 2, 4, 10, and 20 r.p.m.

(B) A similar composition is prepared using 84 parts of a carboxyl-terminated polybutadiene-acrylonitrile copolymer, 12 parts of the same epoxy resin, and 4.8 parts of the same dioctylphthalate-containing disperse system. At the same r.p.m. values, it exhibits centipoise values of 222,000; 201,000; 171,200; and 144,800.

Example BB

A commercially available polyurethane resin (Wyandotte WU 3006-T) is blended with a colloidal disperse system consisting of 2 parts by weight of the dioctylphthalate-containing disperse system of Example AA and 1 part of the disperse system of Example II. The weight ratio of polyurethane resin to the disperse system mixture is 100:5. The resulting composition exhibits Brookfield Viscometer cps. values of 84,000; 78,000; 68,000; and 62,600.

Example CC

The colloidal disperse system-dioctylphthalate mixture of Example AA which contains 25 parts of dioctylphthalate is blended with styrene in a Hobart mixer in a weight ratio of 8:7. Twenty parts by weight of the resulting mixture is blended with 400 parts of a commercially available polyester resin (Plaskon Polyester from Allied Chemical Co.). Brookfield Viscometer test shows cps. values 10,600; 8,200; 5,750; and 3,660 at r.p.m. values of 2, 4, 10 and 20.

What is claimed is:

1. A resinous composition comprising an intimate admixture of
   (A) a polymeric resin, and
   (B) a non-Newtonian colloidal disperse system comprising
      (1) solid, metal-containing colloidal particles predispersed in
      (2) a liquid dispersing medium, and
      (3) as an essential third component, at least one organic compound which is soluble in said dispersing medium, the molecules of said organic compound being characterized by a hydrophobic portion and at least one polar substituent.

2. A composition according to claim 1 wherein at least a portion of the organic compounds are oriented along the external surface of the colloidal particles thereby forming micellar colloidal particles characterized by at least one metal-containing layer, at least one hydrophobic layer, and a polar layer bridging said metal-containing layer and said hydrophobic layer.

3. A composition according to claim 1 wherein the colloidal disperse system is present in the composition in an amount of from about 0.1% to about 25% by weight based on the weight of polymeric resin present in the composition.

4. A composition according to claim 3 wherein the colloidal disperse system is present in the composition in an amount of from about 2.0% to about 15% by weight based on the weight of polymeric resin present in the composition.

5. A composition according to claim 4 wherein said solid, metal-containing colloidal particles comprise solid metal salts.

6. A composition according to claim 5 wherein at least 10% of the solid, metal-containing colloidal particles are characterized by having been formed in situ.

7. A composition according to claim 6 wherein the solid metal-containing particles are further characterized by having a unit particle size of from about 20 A. to about 1000 A.

8. A composition according to claim 7 wherein the solid metal-containing particles are selected from alkali and alkaline earth metal salts.

9. A composition according to claim 8 wherein the third component comprises at least one member selected from the class consisting of alkali and alkaline earth metal salts of oil-soluble organic acids.

10. A composition according to claim 9 wherein said organic acids are selected from the class consisting of sulfonic acids and carboxylic acids.

11. A composition according to claim 10 wherein the salts of the oil-soluble organic acids are alkaline earth metal salts.

12. A composition according to claim 11 wherein the solid metal-containing particles are alkaline earth metal salts.

13. A composition according to claim 11 wherein said solid alkaline earth metal salts are selected from the group consisting of alkaline earth metal acetates, formates, carbonates, hydrogen carbonates, hydrogen sulfides, sulfites, hydrogen sulfites, and chlorides.

14. A composition according to claim 13 wherein said salts are selected from the class consisting of calcium and barium carbonates and acetates.

15. A composition according to claim 14 wherein said resinous composition contains a solvent for said resin.

16. A resinous composition according to claim 3 characterized by thixotropic or pseudoplastic properties comprising an intimate admixture of
   (A) a polymeric resin, and
   (B) a non-Newtonian colloidal disperse system comprising
      (1) solid, metal-containing colloidal particles consisting essentially of alkaline earth metal salts, these salts being characterized by having been formed in situ,
      (2) a disperse medium consisting essentially of at least one inert, organic liquid, and
      (3) as an essential third component, at least one organic compound which is soluble in the disperse medium and which is selected from the class consisting of the alkali and alkaline earth metal salts of oil-soluble petrosulfonic acids, mono-, di-, and tri- aliphatic hydrocarbon substituted aryl sulfonic acids, and oil-soluble fatty acids.

17. A composition according to claim 16 wherein said solid, metal-containing colloidal particles have a unit particles size of from about 20 A. to about 1000 A.

18. A composition according to claim 17 wherein said disperse medium comprises a liquid petroleum fraction.

19. A composition according to claim 18 wherein said disperse medium comprises mineral oil.

20. A composition according to claim 18 wherein said solid, metal-containing colloidal particles at least one member selected from the class consisting of calcium and barium carbonates and acetates.

21. A composition according to claim 20 wherein said polymeric resin is polyvinyl chloride.

22. A composition according to claim 21 wherein said solid, metal-containing colloidal particles have a unit particle size of from about 30 A. to about 400 A.

23. A composition according to claim 22 wherein said disperse system is present in an amount of from about 2% to about 15% by weight based on the weight of polyvinyl chloride present in the composition.

24. A composition according to claim 23 wherein said solid, metal-containing colloidal particles comprise calcium carbonate and said third component comprises calcium petrosulfonate.

25. A composition according to claim 24 wherein said resinous composition comprises a plasticizer for polyvinyl chloride.

References Cited

UNITED STATES PATENTS 3,242,079   3/1966   McMillen _____ 252—39

DANIEL E. WYMAN, *Primary Examiner.*

I. VAUGHN, *Assistant Examiner.*

UNITED STATES PATENT OFFICE
CERTIFICATE OF CORRECTION

Patent No. 3,384,586                          May 21, 1968

Richard L. McMillen

It is certified that error appears in the above identified patent and that said Letters Patent are hereby corrected as shown below:

Column 34, line 56, "40" should read -- 39 --; line 64, "39" should read -- 40 --.

Signed and sealed this 1st day of December 1970.

(SEAL)
Attest:

Edward M. Fletcher, Jr.                WILLIAM E. SCHUYLER, JR.
Attesting Officer                         Commissioner of Patents